United States Patent [19]

Hartford

[11] 3,964,443

[45] June 22, 1976

[54] DIGITAL ENGINE CONTROL SYSTEM USING DDA SCHEDULE GENERATORS

[75] Inventor: Thomas William Hartford, Livonia, Mich.

[73] Assignee: The Bendix Corporation, Southfield, Mich.

[22] Filed: June 7, 1973

[21] Appl. No.: 367,990

Related U.S. Application Data

[63] Continuation of Ser. No. 363,919, May 25, 1973, abandoned.

[52] U.S. Cl. .................... 123/32 EA; 235/151.21; 235/197
[51] Int. Cl.² .................... F02B 3/00; F02D 19/10
[58] Field of Search .................... 123/32 EA, 32 AE; 235/151.21, 151.31, 197

[56] References Cited
UNITED STATES PATENTS

| | | | |
|---|---|---|---|
| 2,841,328 | 7/1958 | Steele | 235/61 |
| 3,426,184 | 6/1969 | Riseman | 235/152 |
| 3,483,364 | 12/1969 | Leeson | 235/197 |
| 3,582,622 | 6/1971 | Okupa | 235/150.31 |
| 3,674,999 | 7/1972 | Kelling | 235/150.31 |
| 3,676,655 | 7/1972 | Ancona | 235/152 |
| 3,689,753 | 9/1972 | Williams | 123/32 EA |
| 3,701,890 | 10/1972 | Dummermuth | 235/150.31 |
| 3,793,882 | 2/1974 | Holben | 235/150.21 |
| 3,831,563 | 8/1974 | Brittain | 123/32 EA |
| 3,835,819 | 9/1974 | Anderson | 123/32 EA |

OTHER PUBLICATIONS

"Electronic Fuel Injection", Electronics Magazine, Sept. 11, 1972, pp. 121–225.

*Primary Examiner*—Charles J. Myhre
*Assistant Examiner*—Ronald B. Cox
*Attorney, Agent, or Firm*—Gerald K. Flagg

[57] ABSTRACT

A first pair of DDAs for interpolating along a predetermined MAP-RPM-Fuel schedule for an internal combustion engine and a second pair for iterpolating along a predetermined MAP-TEMP-ENRICH schedule. Each DDA interpolates along a predetermind specific schedule for a number of iterations directly proportional to the magnitude of one of the engine dependent parameters comprising the schedule without necessitating any intervening conversion into or out of a binary number. The first DDA of each pair using slope and intersection data from a small memory interpolates linearly along at least two contiguous segments and feeds the second DDA which by feeding different register stages to different adders interpolates nonlinearly to effect a predetermined logarithmic relationship. The outputs of the two pairs are summed and then suitably clocked to selectively gate different fuel injectors.

31 Claims, 23 Drawing Figures

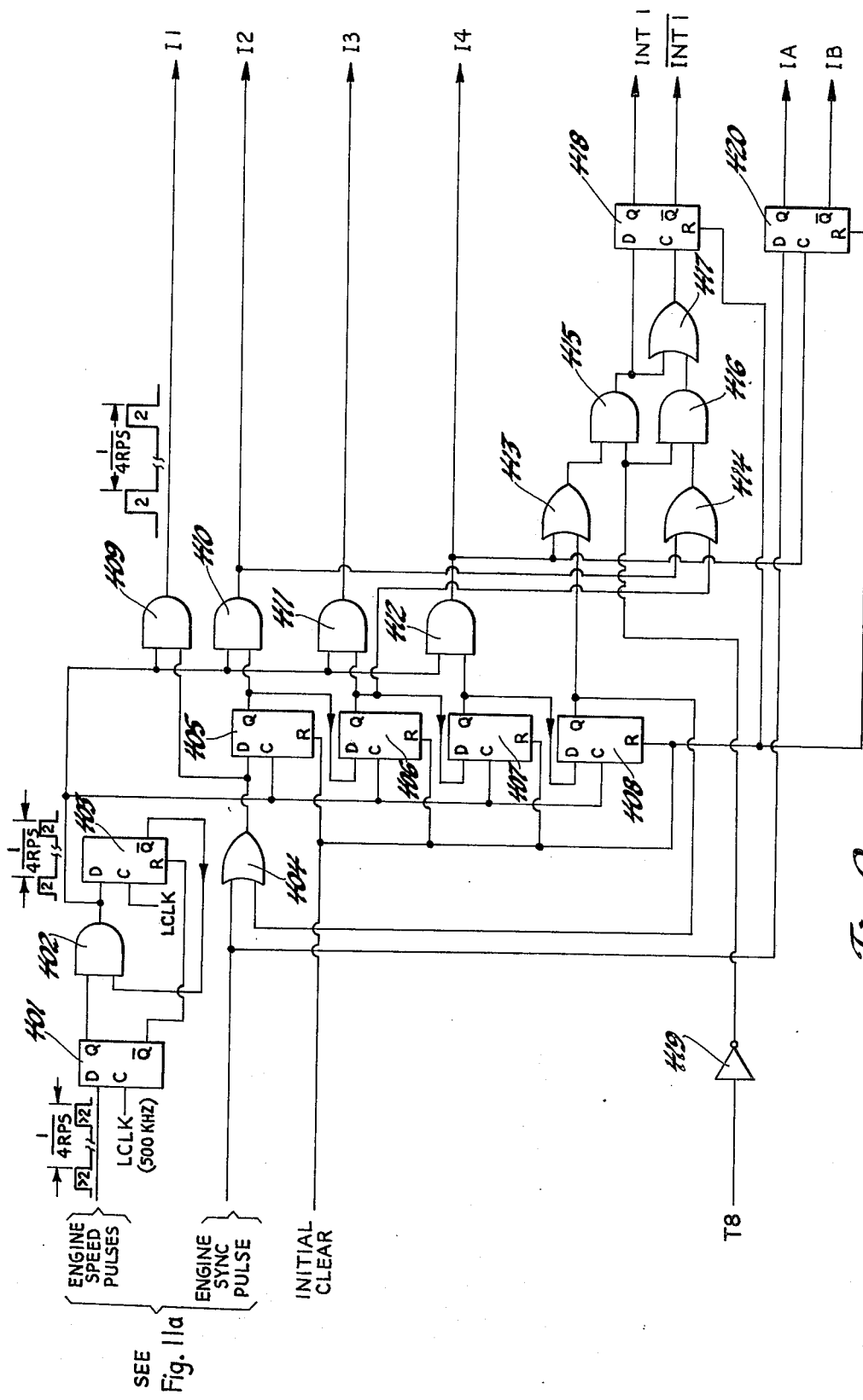

DIGITAL ENGINE CONTROL SYSTEM USING DDA SCHEDULE GENERATORS

This application is a continuation of application 363,919 filed May 25, 1973 entitled "Digital Engine Control System Using DDA Schedule Generators" by Thomas W. Hartford now abandoned.

This invention relates to combustion control systems for internal combustion engines and particularly to the type of control systems for controlling a combustion control device with a pulsed control signal having a variable pulse width.

BACKGROUND OF THE INVENTION

The complexity of internal combustion engine control systems has increased over the years in an attempt to draw an optimum compromise between engine performance, efficiency, and exhaust emission content. For exmple, the correct amount of fuel metered into the engine by an electronic fuel injection system is a complex function of manifold pressure, engine speed, coolant temperature, air temperature, and throttle angle schedules. The combination of two or more of these schedules results in multiple dimension "contour maps" which are typically nonlinear and/or discontinuous. Analog techniques have heretofore been employed to provide schedules solving these contour maps. For example, as disclosed in U.S. Pat. No. 2,980,090 issued Feb. 4, 1957 to R. W. Sutton on a "Fuel Injection System," discontinuous linear segment function generator circuits and/or nonlinear function generators are utilized to approximate the contour shapes. While digital systems for solving such contour maps have only been reported heretofore, such systems store the various points of the contour map in some form of memory and employ a linear interpolator to interpolate between stored points of the function.

Current analog function generation schemes are limited in accuracy, are subject to problems of temperature drift, and ultimately are expected to be limited to a higher cost of implementation than systems utilizing digital technology. On the other hand, digital systems utilizing read-only memory appear to require a large number of words of storage in order to provide accurate function generation of the various maps. For example, a publication on one application reported that approximately 2,048 words of storage were required for a low performance system. High performance systems may require considerable more storage capacity. The present invention recognizes that certain three dimensional internal combustion engine schedules and particularly schedules for moderate performance machines are closely approximated by as few as just two component schedules, one of which comprises a fixed logarithmic segment.

It is well known that the ignition spark advance angle must be increased as a function of engine speed in order to allow for the slow combustion of the fuel. It is also well known that good acceleration characteristics require that the ignition spark advance angle be decreased for acceleration.

Past ignition advance schemes have consisted mainly of providing speed advance by the use of mechanical centrifical advance mechanism on the distributor. Retard of the advance mechanism is provided by a vacuum advance control on the distributor. It is believed, however, that these mechanisms will not provide sufficiently accurate spark advance control in order to allow meeting Federal emission standards while yet providing a vehicle with good driveability.

Matrix studies have been conducted on automobile engines which indicate that further, more complex control of the spark advance angle can become an important factor in reducing the air pollution generated by an internal combustion engine utilizing the otto cycle. Such studies have been reported in "A Study on Spark Ignition Control Variables" by T. W. Keranen and H. P. Wertheimer, Bendix Technical Journal, Vol. 4, No. 3, 1971. Data published in the Wertheimer reference, supra, indicates that the control of the ignition spark advance will consist primarily of the solution of a three dimensional schedule involving two sensed engine parameters, such as absolute manifold pressure and engine speed.

Accordingly, a scheme of ignition spark advance control is disclosed here which will allow precise control of the engine firing angle by the use of an electronic digital computer. The advantage of this approach to the traditional mechanical and vacuum advance systems is that the specific contour of control schedule required of the engine may be generated more accurately by the electronic computer. An additional cost advantage is expected to occur in the form of time shared electronics which may be utilized, in a preferred implementation, to control both fuel injection and spark advance.

SUMMARY OF THE PRESENT INVENTION

In accordance with the present invention, one or more interpolating type DDA schedule generators are provided to interpolate along and thereby effect one or more of these schedules. Each such interpolator effects a number of interpolations directly proportional one of the parameters constituting the schedule. The interpolators are interconnected to effect a combustion control system wherein a combustion control device is controlled by a pulsed signal, the pulse width of which is incrementally variable in accordance with the interpolation effected by the DDA schedule generators.

More specifically, and in accordance with the present invention an engine control apparatus is provided for controlling an internal combustion engine control device in accordance with a pulsed control signal, the control device being of the type used in a fuel injection system or ignition advance system. The pulsed control signal has an incrementally variable pulse width determined in accordance with a first engine parameter and a second engine parameter. One of these engine parameters comprises an engine load dependent parameter and the other comprises one of an engine speed dependent parameter and an engine load dependent parameter. The engine load dependent parameter is selected from the group of engine load dependent parameters comprising an engine manifold pressure dependent parameter, a throttle position dependent parameter, and an air flow dependent parameter.

The engine control apparatus comprises means for generating a first engine parameter dependent number of clock pulses varying with the first engine parameter and for generating a second engine parameter dependent number of clock pulses varying with the second engine parameter.

First DDA interpolating means are provided for interpolating from a first start point value to a first pulse width value in accordance with a first predetermined engine characteristic for a number of first iterations varying with the first engine parameter dependent number of clock pulses. This first engine characteristic comprises a first segment and a second segment. The first segment comprises a slope breakpoint and a first slope portion including the first start point value and the slope breakpoint, and the first slope portion defines a first predetermined rate of change of the first pulse width values with values of the first engine parameter. The second segment is defined by the slope breakpoint and a second slope portion including the slope breakpoint. The second slope portion provides a second predetermined rate of change of the first pulse width values.

Second DDA interpolating means are provided for interpolating from a second start point value to a second pulse width value in accordance with a second predetermined engine characteristic for a number of second iterations varying with the second engine parameter dependent number of clock pulses. The second predetermined engine characteristic comprises the formula $$T_{i+1} = T_i + (1nB)T_i \Delta P,$$

wherein
1. $T_i$ and $T_{i+1}$ are successive second pulse width values,
2. $\Delta P$ is the change in values of the second engine parameter between the successive pulse width values and
3. $1nB$ comprises a factor having a value of $2^{-n}$.

Control means are provided for establishing one of the first and second start point values at one of the first and second pulse width values. Utilization means are provided for generating the pulsed control signal in accordance with the other of the first and second pulse width values.

It is therefore a prominent object of the present invention to provide an engine control apparatus for controlling an internal combustion engine control device with a pulsed signal the pulsed width of which is generated and incrementally varied by a DDA schedule generator that interpolates along and thereby effects a predetermined schedule relating pulse width to an engine dependent parameter.

It is another prominent object of the present invention to provide an engine control apparatus of the foregoing type wherein the DDA schedule generator interpolates for a number of iterations directly proportional to the magnitude of the engine dependent parameter without first converting such magnitude into a binary number.

It is a further prominent object of the present invention to provide, in an internal combustion engine control system, two DDA schedule generators for interpolating along and thereby effecting a predetermined three-dimensional internal combustion engine schedule using only two fixed predetermined relationships and requiring less than ten 8-bit words of memory storage.

It is a further object of the present invention to provide an internal combustion engine control system of the foregoing type wherein the two schedule generators generate and incrementally vary the pulse width of a pulsed control signal for controlling fuel injection.

It is a further object of the present invention to provide an internal combustion engine control system of the foregoing type wherein the two schedule generators generate and incrementally vary the pulse width of a pulsed control signal for controlling ignition advance.

It is another prominent object of the present invention to provide, in an internal combustion engine control system, a DDA interpolator for interpolating along separate contiguous portions of a predetermined schedule by interpolating along one of such segments until such segment intersects another and then interpolating along the other such segment.

It is a further object of the present invention to provide, in an internal combustion engine control system, a DDA interpolator that interpolates along a predetermined schedule effecting a logarithmic relationship between two engine dependent parameters by concurrently adding to each other the contents of two or more bit positions of a shift register comprising the DDA interpolator.

It is a further prominent object of the present invention to provide, in an internal combustion engine control system, a pulse width control apparatus comprising a first DDA interpolator for effecting a first predetermined schedule and providing an output to a second DDA interpolator for effecting a second predetermined schedule, one input to each interpolator comprising a number of clock pulses directly proportional, without intervening binary conversion, to an engine dependent parameter comprising the schedule being interpolated, one of the DDA interpolators being operative to interpolate along at least two contiguous segments by interpolating along one of such segment until it intersects with the other and then interpolating along the other and the other of the DDA interpolators effecting a logarithmic relationship between parameters comprising the other schedule by concurrently adding to each other two or more bit positions of a register comprising this other DDA interpolator.

These and other objects and features of the present invention will become more apparent from the following description taken in conjunction with the following figures wherein.

Figure 1:
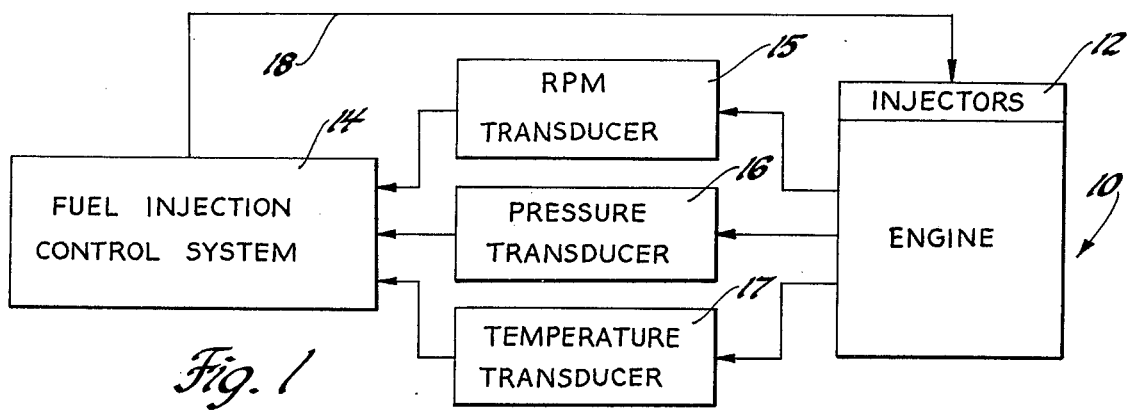
FIG. 1 illustrates in block diagram form a first engine control system in the form of a fuel injection control system utilizing one or more transduced engine dependent parameters to control the duration of fuel injection to an internal combustion engine in accordance with one or more predetermined schedules.
Figure 3A:
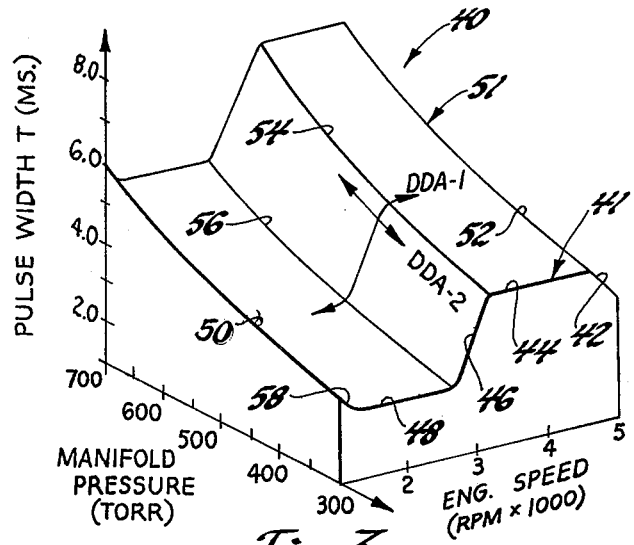
Figure 3B:
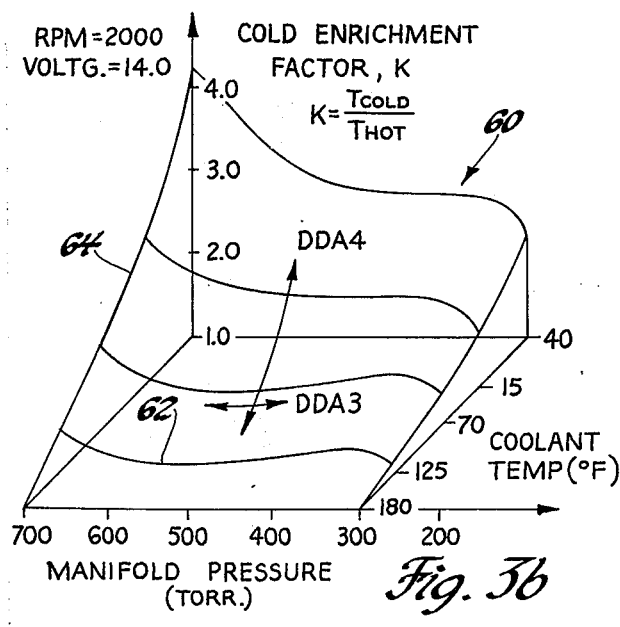
Figure 3C:
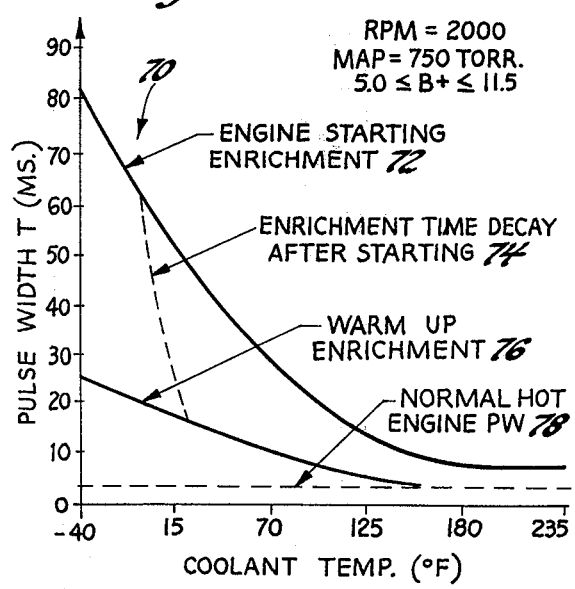
Figure 4:
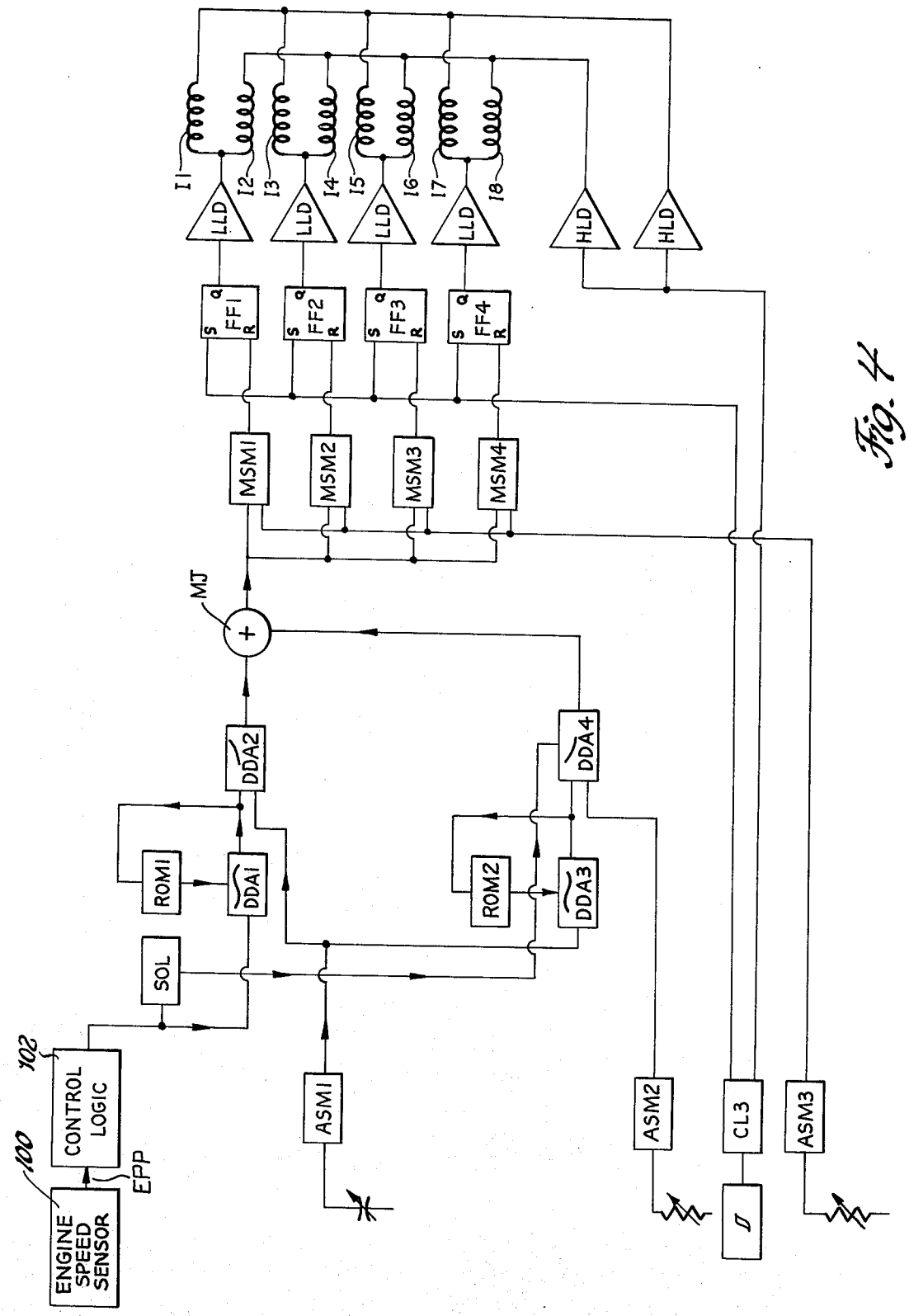
Figure 5:
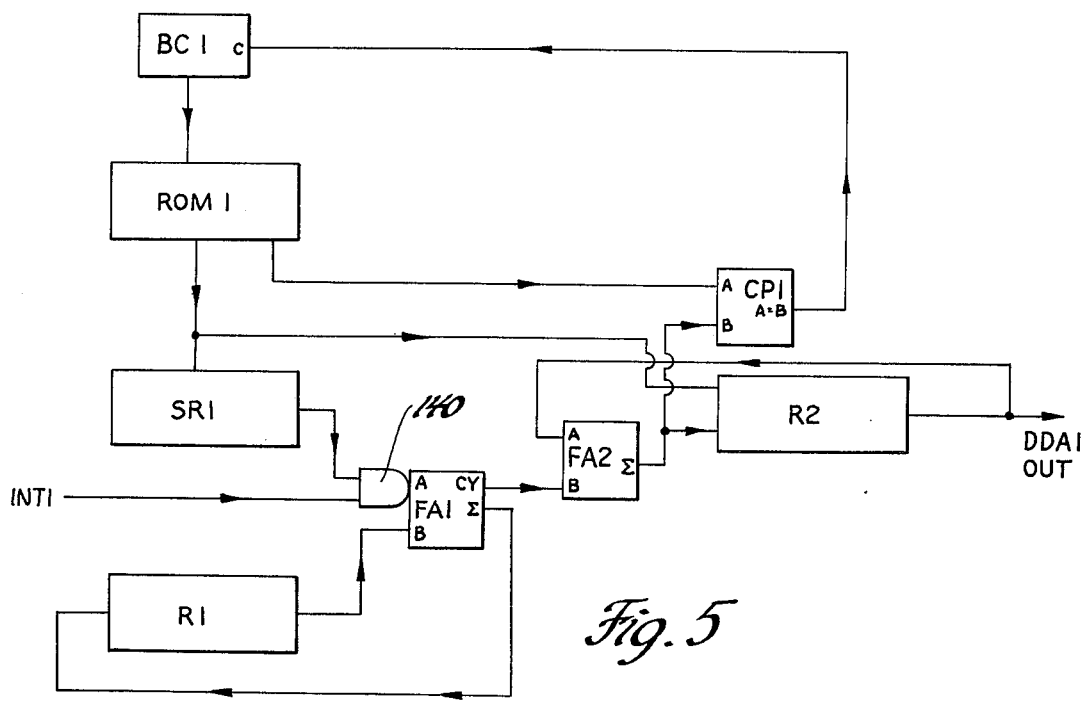
Figure 6:
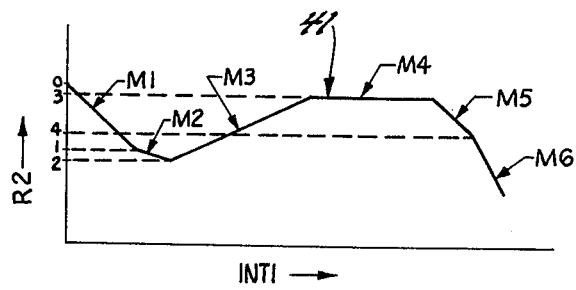
Figure 7:
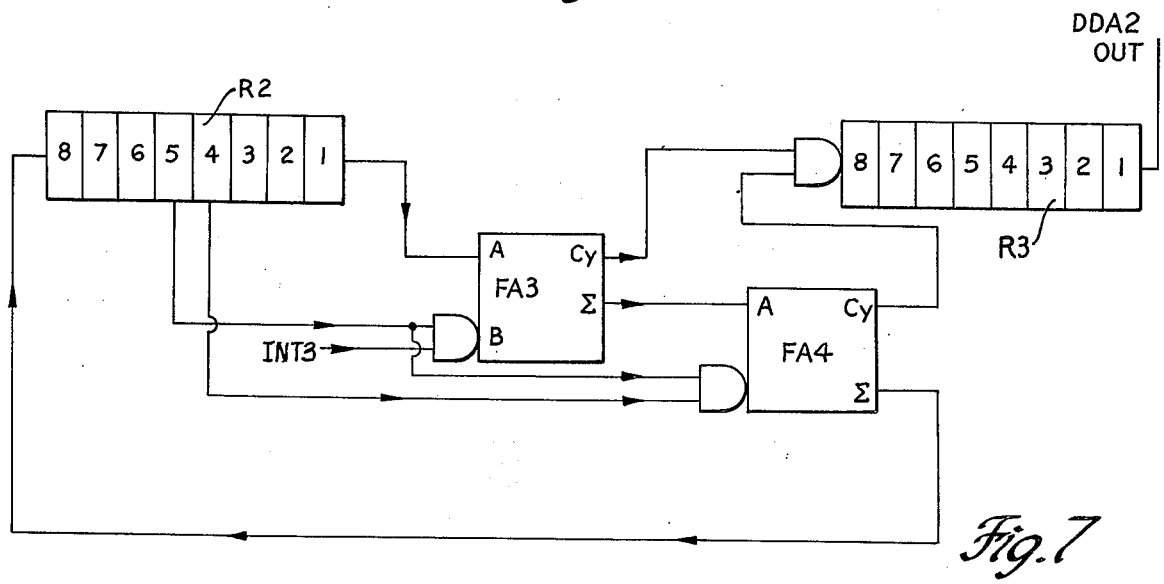
Figure 8A:
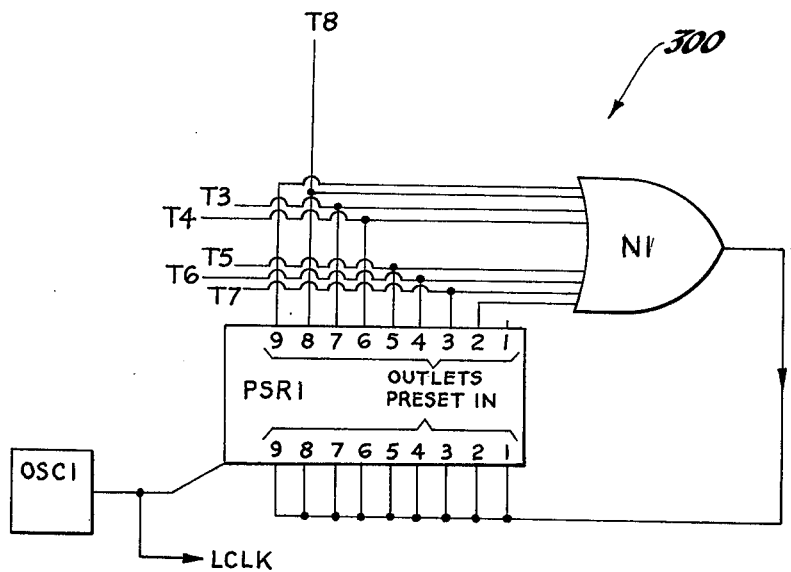
Figure 8B:
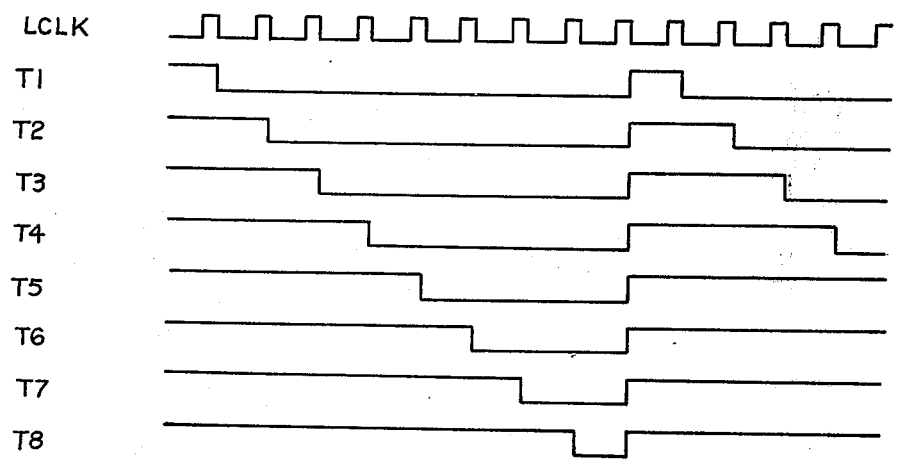
Figure 10:
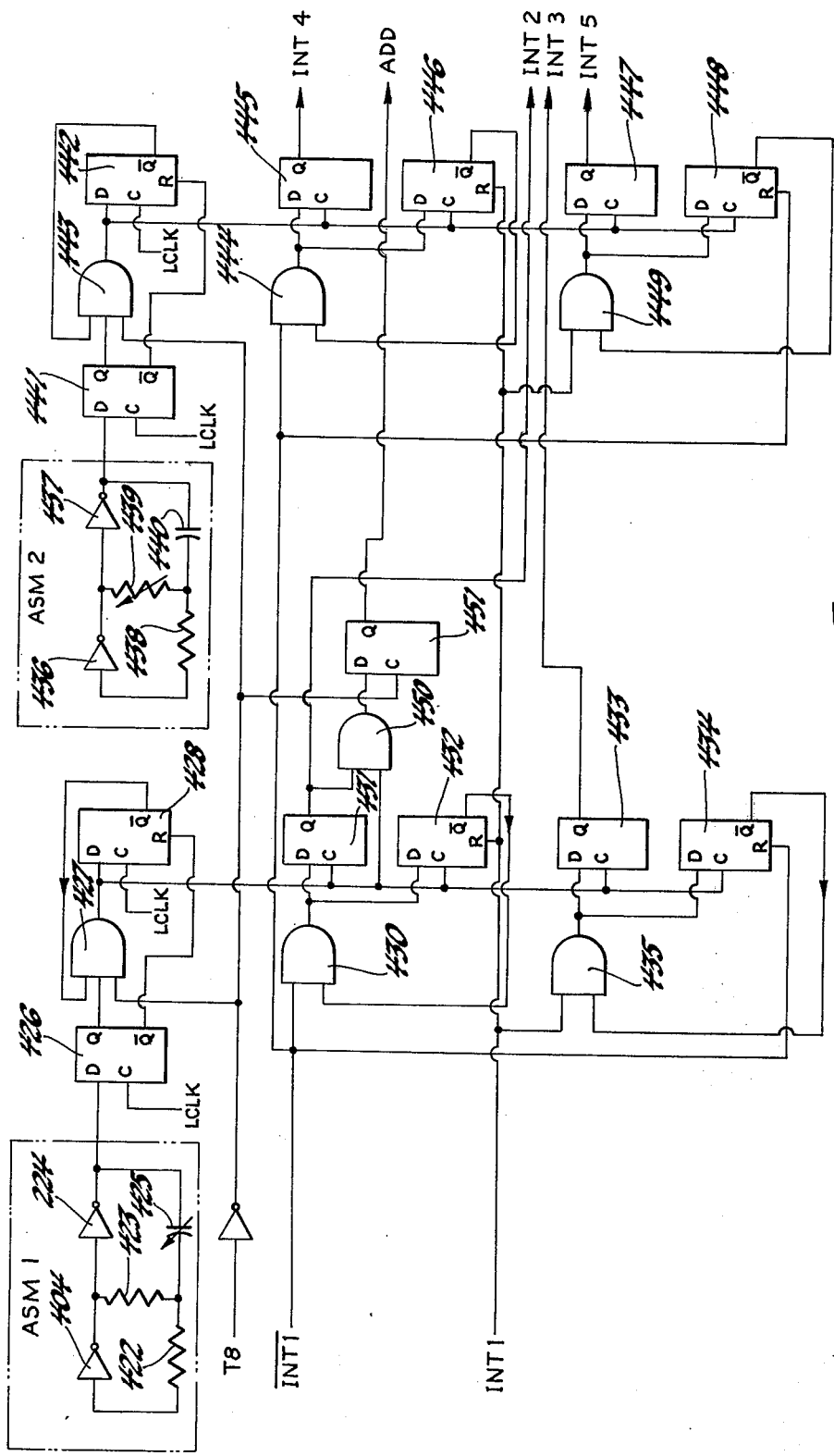
Figure 11A:
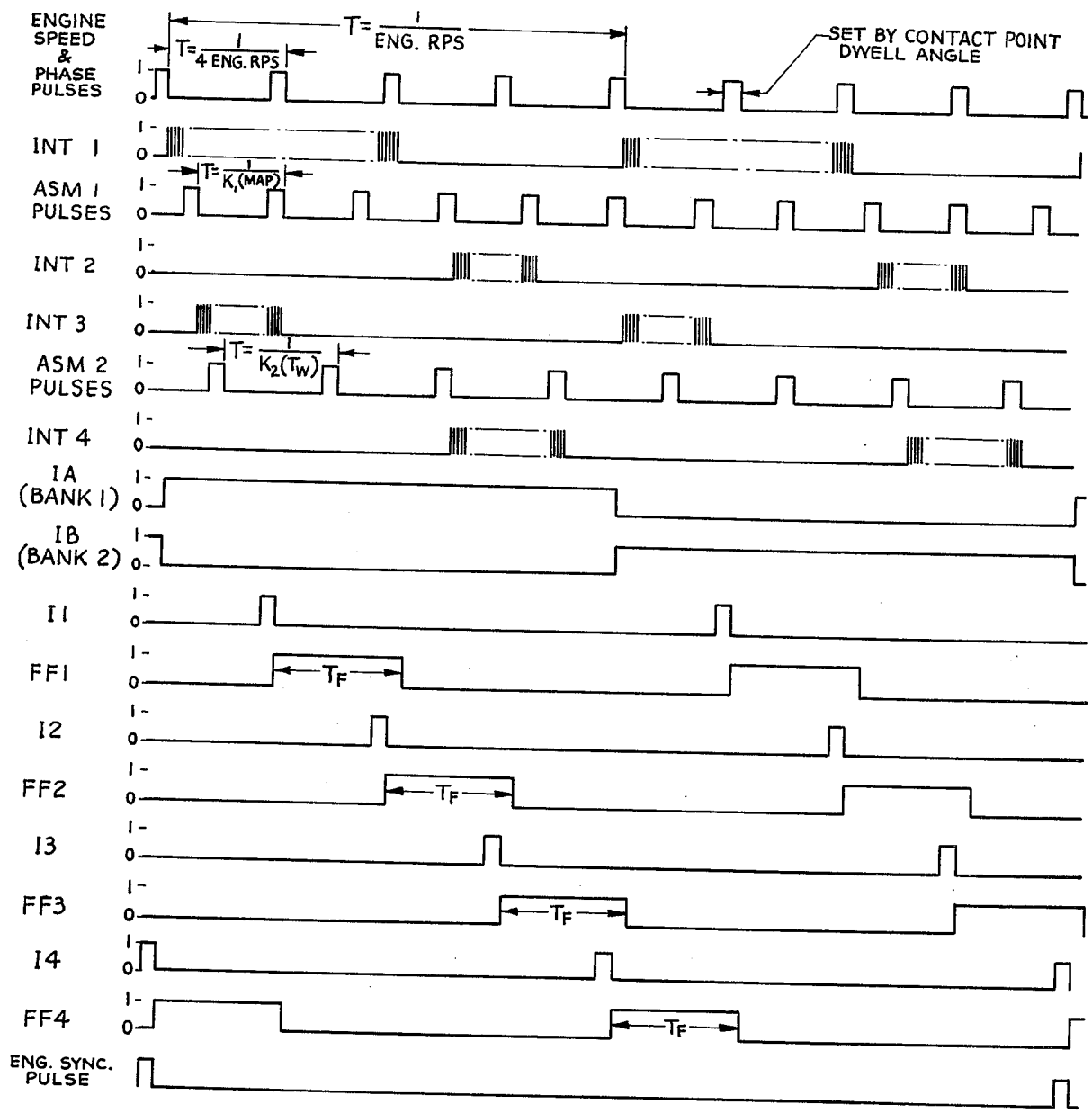
Figure 11B:
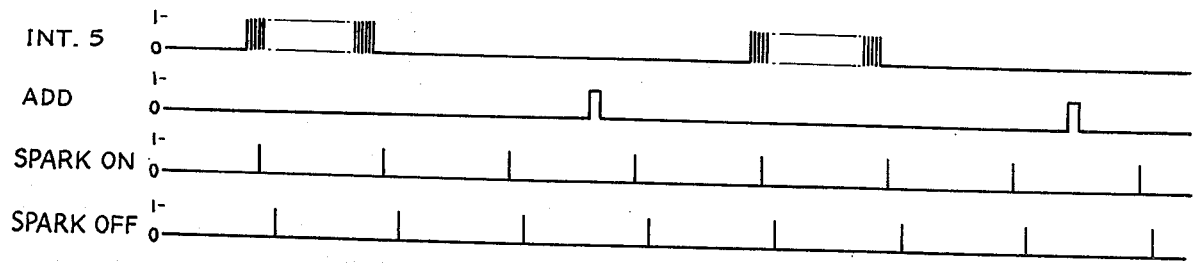
Figure 12:
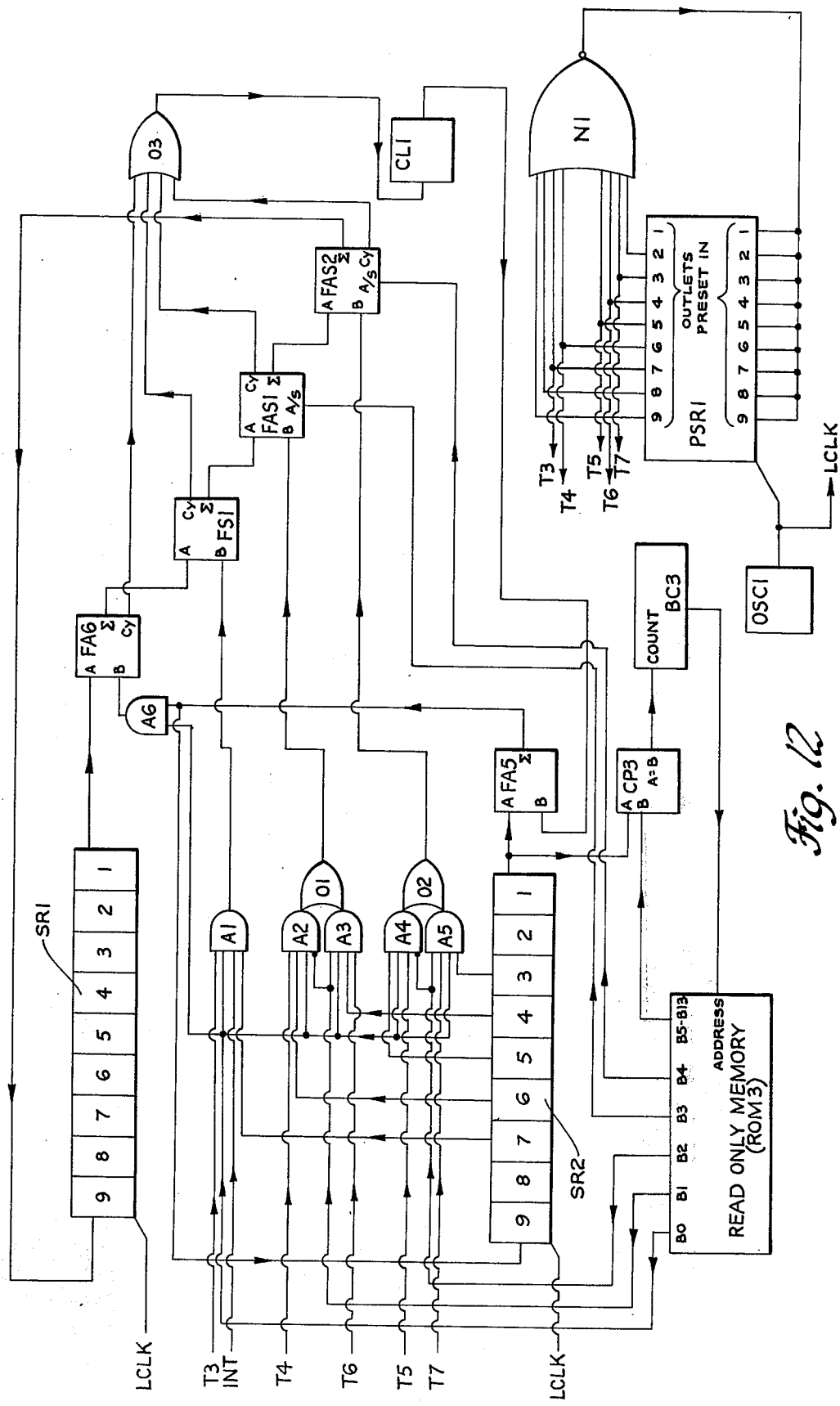
Figure 13:
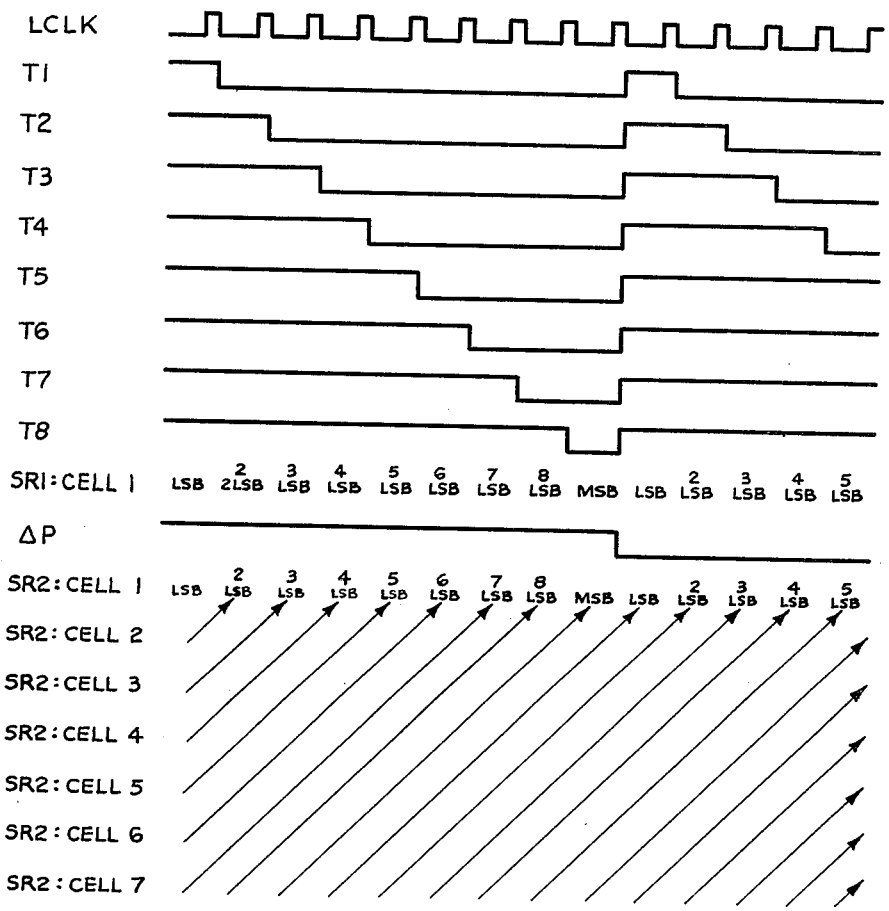
Figure 14:
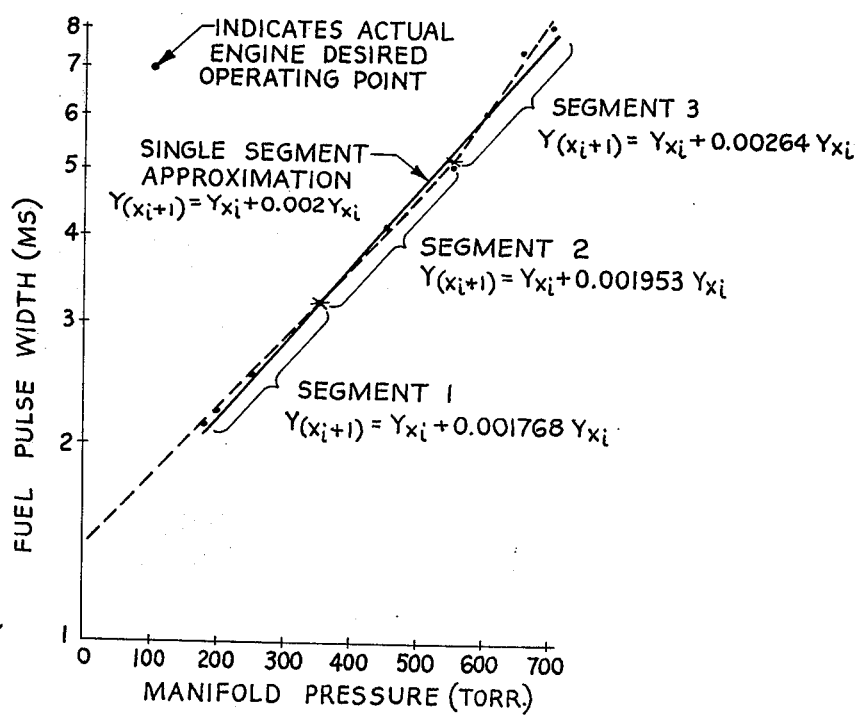
Figure 15:
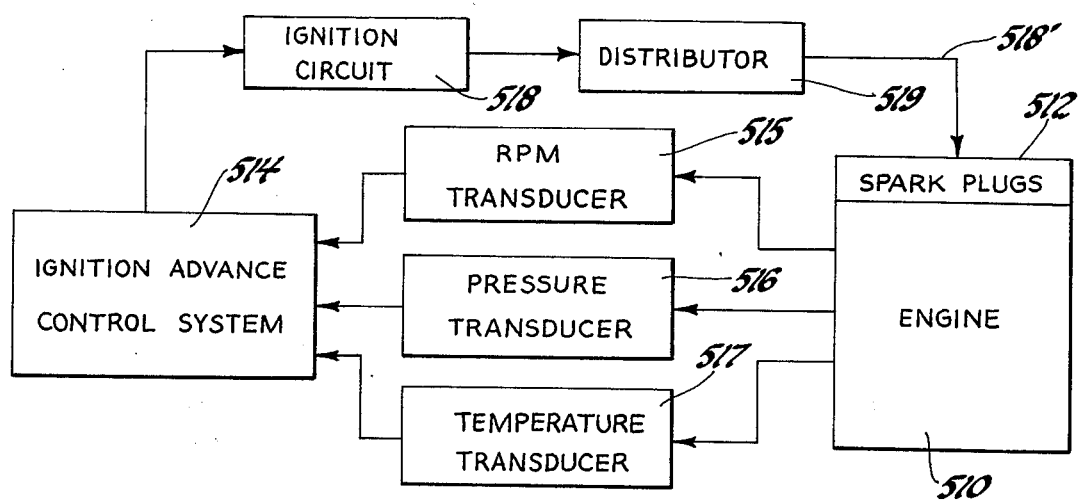
Figure 16:
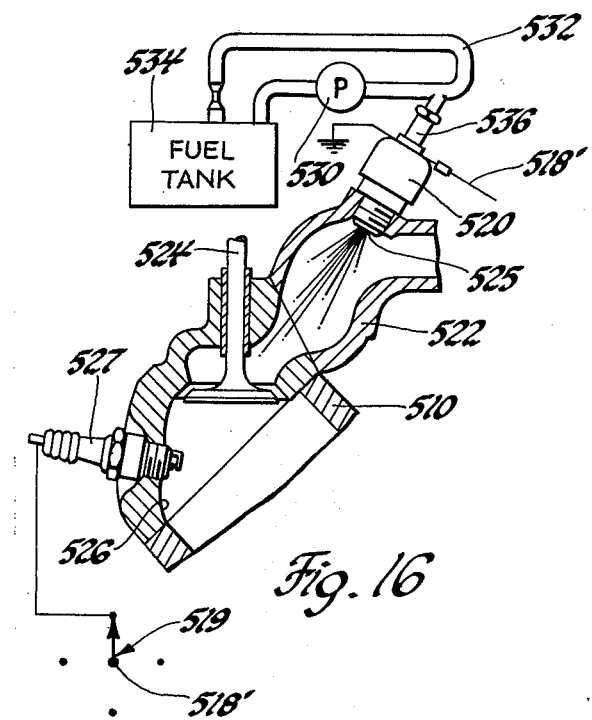
Figure 17:
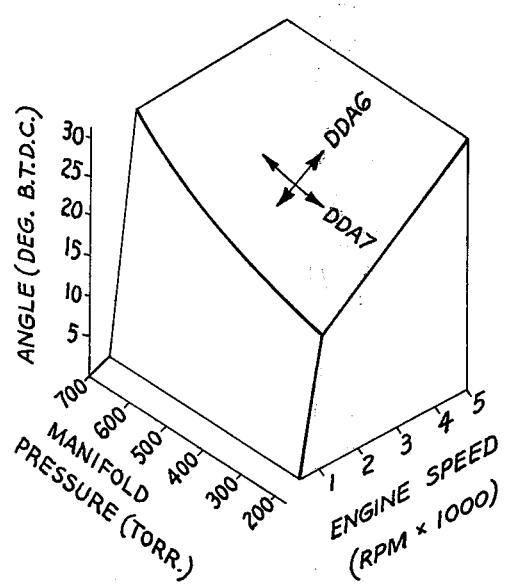
Figure 18:
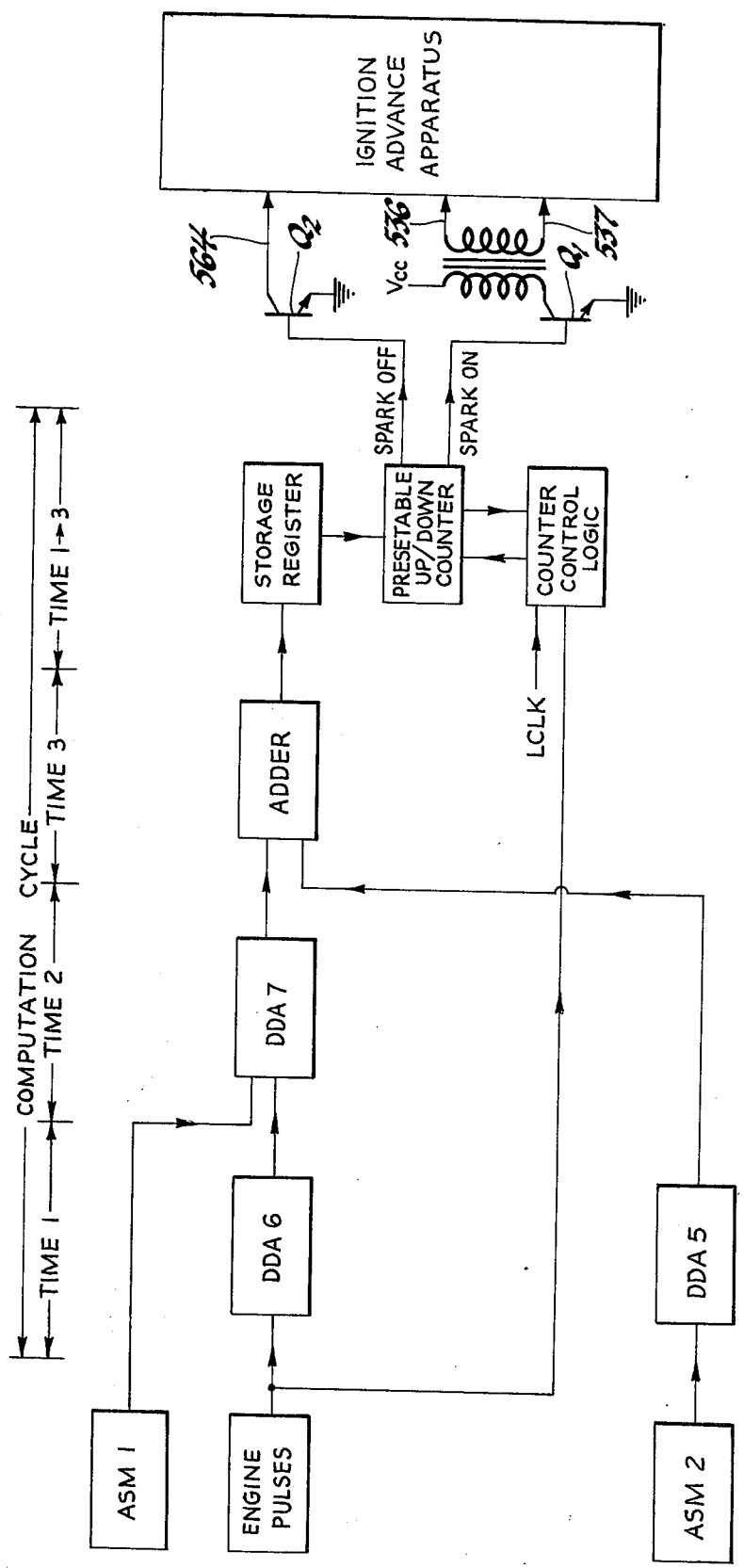
Figure 19:
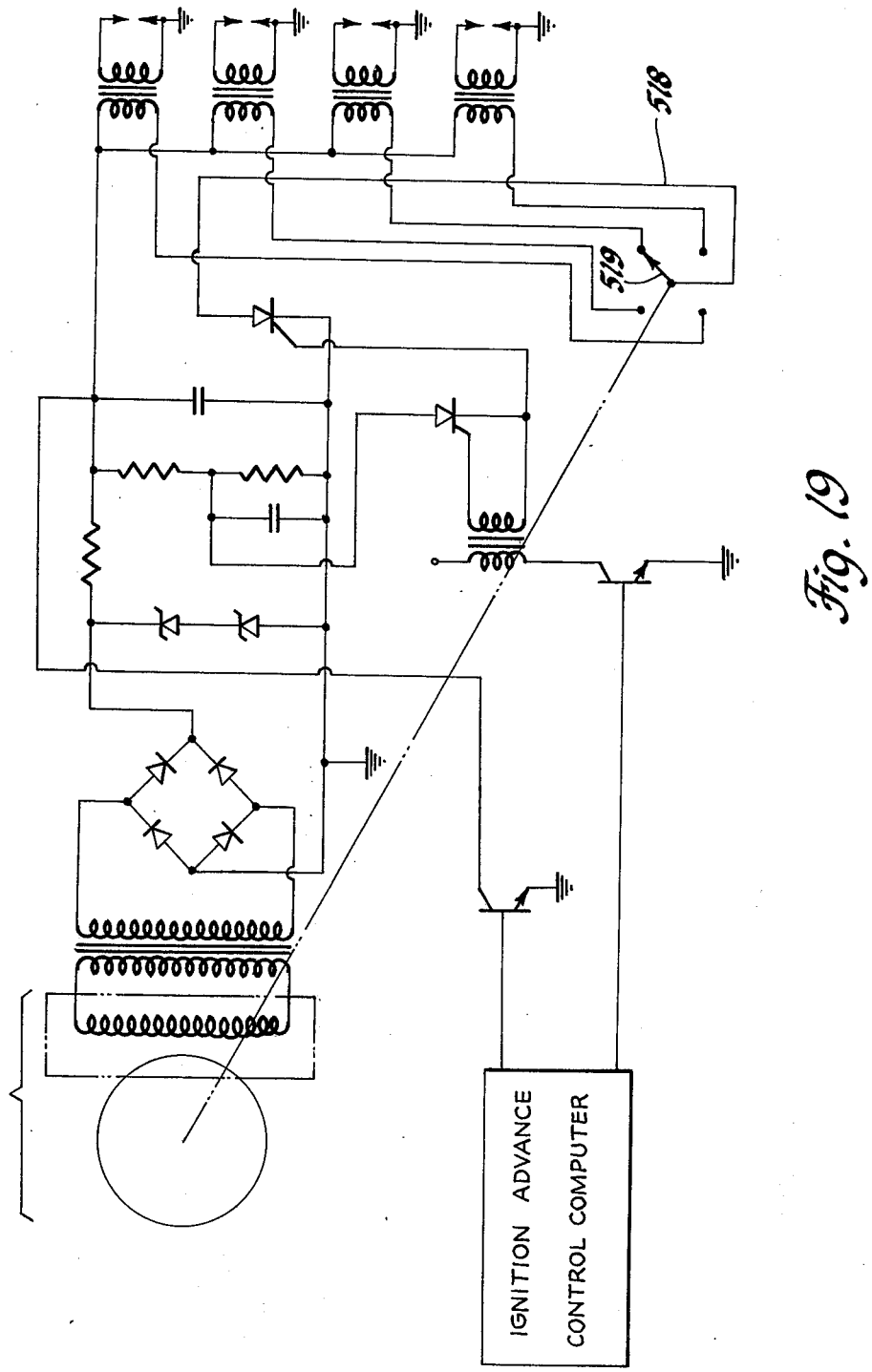

FIG. 3 illustrates three predetermined schedules of the type implemented by the control system of FIG. 1, FIG. 3a illustrating a predetermined three-dimensional engine speed-fuel-manifold air pressure schedule, FIG. 3b illustrating a predetermined three-dimensional cold engine enrichment schedule, and FIG. 3c illustrating a predetermined schedule of starting-fuel and decaying-enrichment after starting;

FIG. 4 illustrates in block form units comprising the engine control system of FIG. 1, such units including engine parameter transducing devices, DDA schedule generators, utilization devices for separately controlling fuel injectors, and control logic for synchronizing the operation of these and other units;

FIG. 5 illustrates in block form the digital devices comprising one of the DDA schedule generators of FIG. 4 for effecting interpolation along separate linear portions of a predetermined schedule;

FIG. 6 illustrates a predetermined schedule of the type effected by the DDA schedule generator of FIG. 5, such predetermined schedule comprising a plurality of contiguous segments each of which has a predetermined slope and a predetermined intersection with contiguous segments;

FIG. 7 illustrates in block form the digital devices comprising another of the DDA schedule generators of FIG. 4 for effecting interpolation along a predetermined schedule comprising at least one logarithmically defined segment;

FIG. 8 illustrates the timing generator portion of the control logic unit of FIG. 4, FIG. 8a illustrating digital devices in the form of an oscillator for generating logic clock (LCLK) pulses and counting devices for generating bit time signals T1–8 and FIG. 8b illustrating the timing relationship between the LCLK pulses and the bit time signals;

FIG. 9 illustrates further devices comprising the control logic unit of FIG. 4;

FIG. 10 illustrates further devices comprising the control logic unit of FIG. 4;

FIG. 11 illustrates timing waveforms generated by portions of control unit illustrated in FIGS. 9 and 10, FIG. 11a illustrating those waveforms employed by the fuel injection control system of FIG. 4 and FIG. 11b illustrating waveforms used in an ignition advance control system of the type illustrated in FIG. 18;

FIG. 12 illustrates a DDA schedule generator of the type illustrated in FIG. 7 for generating a predetermined schedule comprising at least three different logarithmetically defined segments;

FIG. 13 illustrates the time sequence of the shifting of digital information through a register comprising the DDA schedule generator of FIG. 12;

FIG. 14 illustrates in the form of a semi-log chart of fuel pulse width vs. manifold pressure the approximation of desired engine operating points by a single segment (shown solid) schedule of the type generated by the DDA schedule generator of FIG. 7 and by a three contiguous segment (shown dotted) of the type generated by the DDA schedule generator of FIG. 12;

FIG. 15 illustrates in block form a second engine control system in the form of an ignition advance control system for utilizing transduced engine dependent parameters to control the ignition advance of a spark ignition engine in accordance with one or more predetermined schedules;

FIG. 16 is a view with some components partially broken away and others solid of a portion of the ignition advance system of FIG. 15;

FIG. 17 illustrates a predetermined three dimensional schedule of the type effected by the ignition advance system of FIG. 15;

FIG. 18 illustrates in block form units comprising the ignition advance system of FIG. 15 such units including an ignition advance apparatus and digital devices in the form of engine parameter transducers, DDA schedule generators, an adder, a storage register, a presettable up/down counter, and a counter control unit; and FIG. 19 illustrates an ignition advance apparatus of the type that may be controlled by the ignition phase control system of FIG. 18.

FIG. 1 DESCRIPTION

One preferable embodiment of the present invention will now be described in the environment of an engine control system for controlling fuel injection to an internal combustion engine. Reference in this regard should therefore be had to FIG. 1 showing in block diagram form an internal combustion engine 10 comprising fuel delivery means in the form of a plurality of selectively controllable electromagnetically energizable fuel injectors 12.

Each fuel injector 12 is controllable by a fuel injection control system 14 of the type provided in accordance with the present invention to inject suitable fuel under pressure into a desired cylinder of the engine 10 for a precisely controllable period. The duration of the fuel injection period is determined by fuel injection control system 14 in response to one or more engine dependent parameters selected from a group of parameters including engine speed dependent parameters and engine load dependent parameters, in this case engine speed, manifold pressure, and engine temperature. Such engine dependent parameters are first sensed and then transduced into a suitable output signal by suitable transducers in the form of an r.p.m. or speed transducer 15, an engine pressure transducer 16, and an engine temperature transducer 17, respectively, such transducers being of the type specified in further detail below. Each of the transducers 15, 16, and 17 generates an output varying with the respective engine parameter, and such output is communicated to and received by fuel injection control system 14. In response thereto fuel injection control system 14 generates on conductor 18 a fuel injection duration control signal for selecting an injector 12 and controlling the duration of fuel injected thereby, the duration of the control signal being varied so as to interpolate along and thereby effect one or more predetermined schedules relating two or more of the transduced engine dependent parameters.

FIG. 2 DESCRIPTION

Figure 2:
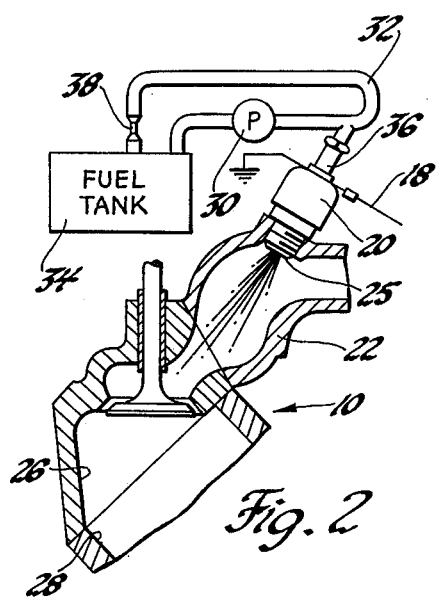
FIG. 2 is a view with some parts partially broken away and others solid of a portion of the engine control system of FIG. 1.

As may be better understood with reference to FIG. 2, each of the fuel injectors 12 comprises an electromagnetically operated injector valve 20 mounted in the intake manifold 22 of engine 10 upstream of an independently actuated and synchronized fuel intake valve 24 (shown open). Each electromagnetically operated injector 12 comprises a coil connected to control system 14 by conductor 18 and operative to actuate injector valve 20 to open and close a fuel passage therethrough. When open, the outlet end 25 of valve 20 injects fuel into a corresponding engine combustion chamber 26 opening downwardly into the bore of cylinder 28. A suitable fuel pump 30 is connected in a fuel rail 32 intermediate a fuel tank 34 and the inlet end 36 of injector valve 20 to supply fuel under pressure to injector inlet 36 by pumping against a suitable orifice 38 in the return portion of fuel rail 32 intermediate injector valve inlet 36 and fuel tank 34.

FIG. 3 DESCRIPTION

As will be described in further detail below, fuel injection control system 14 comprises a plurality of schedule generators in the form of digital differential analyzers (DDA) of the type provided in accordance with the present invention. In one illustrated and hereinafter described embodiment of the invention, four such DDA's, DDA 1, DDA 2, DDA 3, and DDA 4 are suitably interconnected to incrementally interpolate along and thereby effect four predetermined relationships among selected engine dependent parameters.

More specifically, and with reference to the DDA designations shown in FIG. 3a, a first digital differential analyzer DDA 1 incrementally interpolates along and thereby effects a predetermined relationship on a schedule 41 between the pulse width T of the control signal to injectors 12 and engine speed, this first relationship being hereinafter termed the engine speed dependent relationship characteristic, or schedule. As may be best understood with reference to an imaginary vertical plane through the pulse width-manifold pressure-engine speed schedule illustrated in FIG. 3a, this predetermined engine speed dependent characteristic 41 is defined by two or more linear segment portions, five such linear segment portions 42, 44, 46, 48, and 50 being generally illustrated in FIG. 3a and also in greater detail in FIG. 6. Contiguous segment portions meet at a well defined breakpoint or corner, a first breakpoint 52 being illustrated between segment portions 42 and 44; a second breakpoint 54 being illustrated between segment portions 44 and 46; a third breakpoint 56 being illustrated between segment portions 46 and 48; and a fourth breakpoint 58 being illustrated between segment portions 48 and 50.

DDA 1 in the presently described embodiment commences incremental interpolation from a beginning pulse width value, as for example, at the high speed end of the schedule, and interpolates along schedule 41 for a number of complete iterations varying directly with the magnitude of transduced engine speed. An intermediate pulse width value on schedule 41 is provided by DDA 1 corresponding with completion of the engine speed dependent number of iterations.

Using the intermediate pulse width value generated by DDA 1, a second differential digital analyzer DDA 2 commences incremental interpolation along and thereby effects a second predetermined schedule 51 defining a logarithmic relationship between pulse width and manifold pressure. DDA 2 in the presently described embodiment of the invention commences incremental interpolation from the low pressure end of schedule 51 and interpolates for a number of complete iterations varying directly with the magnitude of an engine load dependent parameter such as in this case the transduced engine manifold pressure.

It is noted that in the particular fuel injection control system disclosed hereat, that the entire schedule 40 illustrated in FIG. 3a is effected by only two DDA interpolators, each generating a single fixed schedule. Such simplification of equipment and technique obtains from the fact that the specific schedule 40 being implemented is comprised of substantially uniform contour in the engine speed-pulse width plane or domain 41. One schedule 41 therefore suffices for each manifold pressure of interest, since such schedule is substantially the same at each manifold pressure. Similarly, schedule 40 is also comprised of a substantially uniform contour in the manifold pressure-pulse width plane or domain 51. One schedule 51 of the logarithmic type indicated thus suffices for each of the engine speeds of interest since such schedule is also substantially the same for each engine speed.

The resulting pulse width value generated and provided by DDA 2 is modified by a cold enrichment factor determined by the output of a second set of digital differential analyzers DDA 3 and DDA 4 cooperating to interpolate along a second predetermined schedule 60 illustrated in FIG. 3b. As illustrated, DDA 3 effects a predetermined nonlinear relationship 62 between a cold enrichment factor K and manifold pressure while DDA 4 effects a fourth predetermined relationship 64 between cold enrichment factor K and coolant temperature.

Further means are provided, as will be explained, for modifying the pulse width generated by the cooperation of DDA's 1-4 to effect starting conditions in accordance with starting conditions schedule 70 illustrated in FIG. 3c, such schedule comprising an engine starting enrichment portion 72, an enrichment time decay after starting portion 74, a warm-up enrichment portion 76, and a normal hot engine pulse width portion 78.

FIG. 4 BLOCK DIAGRAM DESCRIPTION

The interconnection of DDA's 1-4 with each other and with other digital devices is illustrated to a block diagram level in the block diagram of FIG. 4. Therein, two read-only memories are designated ROM 1-2, three astable multivibrators are designated ASM 1-3, four monostable multivibrators are designated MSM 1-4, four set-reset flip flops are designated FF1-4, four low level driver amplifiers are designated LLD 1-4, individual electromagnetic injector valve actuation coils are designated I 1-8, two high level driver amplifiers are designated HLD 1-2, and a suitable mixing junction for combining the output of DDA's 1 and 2 with the output of DDA's 3 and 4 is designated as MJ.

The cooperation and nature of these units will be described to a functional level only, the detailed timing relationships therebetween, constituent components thereof, and detailed interconnection theretogether being subscribed in greater detail in subsequent portions of this specification. Starting at the input, or left, end of the control system when viewed in FIG. 4, a suitable speed sensor 100 in the form of an electromagnetic pickup provides one or more engine speed serial pulses EPP for each revolution of a crankshaft driven member of engine 10, such crankshaft driven member being selected from a group of engine crankshaft driven members comprising a crankshaft, a cam shaft, a distributor shaft, a rotary piston shaft, or any other rotatable member capable of providing precise timing information for engine control purposes.

The EPP pulse is used through appropriate control logic 102 to start the cycle of computations. The first schedule to be discussed is that of FIG. 3a. Digital differential analyzer DDA 1 is used to interpolate along the engine speed versus fuel pulse width portion 41 of the contour map during a time interval which varies as the reciprocal of engine speed. At the end of this computation the interpolator will stop at the point on the speed versus pulse width characteristic representing the current engine speed. The foregoing point then becomes the starting point for the interpolation involving DDA 2. DDA 2 interpolates along the manifold pressure versus pulse width characteristic 51 to obtain the final computed pulse width. This interpolation is controlled by the time between pulses of a first astable multivibrator ASM1 controlled by a variable capacitance pressure transducer, such multivibrator and transducer being of the type described in further detail below with reference to FIG. 10. Concurrent with the above mentioned computations, DDA 3 is used to solve the pressure versus enrichment factor characteristic 62 shown in FIG. 3b. The number obtained from the DDA 3 computation becomes the starting point for the interpolation along the temperature versus cold enrichment factor characteristic 64, which is interpolated by DDA 4. The interpolation of the DDA 4 is controlled by the period of the astable multivibrator ASM2 which in turn is controlled by a thermistor temperature sensor.

At the end of the above mentioned interpolations, the numbers obtained are summed and transferred to four monostable multivibrators MSM1–4. These monostable multivibrators are used to control the reset of four flip-flops, FF1, FF2, FF3, and FF4. The four flip-flops FF1, FF2, FF3 and FF4 ae each set by the injection commands derived by a CL3 control logic CL3 from the engine phase signals, indicated in the block diagram by the $\theta$ block. The engine phase signals serve to inform the computer of the engine crank angle. When an injection is required, a flip-flop corresponding to a given injector coil I of an injector 12 is set. This initiates the operation of the monostable multivibrator which generates the reset pulse to the flip-flop, at the end of the time duration computed above. The true (Q) output of each flip-flop is wired to a power driver which is used to turn-on one of two injectors. Since the block diagram illustrates an 8-cylinder engine in which, during one revolution of the engine, one of two banks of four injectors is enabled by the high-level driver HLD and the individual one of four injectors of the selected bank is selected by the low-level drivers LLD.

The monostable multivibrators MSM1, MSM2, MSM3, MSM4 in FIG. 4 are implemented by means of binary counters or a register and an adder. When a given flip-flop is set, by an injection command I1 through I4, the corresponding multivibrator begins to time out by either counting down a binary counter with the ASM3 pulses or by subtracting from a register the number 1 for each ASM3 pulse. When the counter or register contains 0 count the corresponding flip-flop is reset. Thus, the number computed by DDA2 and DDA4 serves to code and control the time duration during which any of the 4 flip-flops set. When the flip-flop is set, it applies an enabling signal to a low level driver LLD which in turn applies the low system potential or ground to the two injectors powered by the driver. The two injectors are each connected to two separate banks of injectors selected by the IA and IB signal and the corresponding level driver HLD. The enabled HLD serves to select which bank of injector solenoids, even or odd numbered, is connected to the high battery potential. Thus with a given HLD, a particular injector is activated by its corresponding LLD being enabled by a flip-flop. The frequency of ASM3 can be controlled by an external variable resistor or capacitor. Thus, an additional sensed parameter could be used to further modify the injection time by controlling the frequency of ASM3.

DESCRIPTION OF FIG. 5 LINEAR INTERPOLATOR

A DDA interpolator consists of a group of digital devices interconnected so as to solve the following equation:

$$Y_{i+1} = Y_i + \Delta Y \tag{1}$$

By way of illustration, consider the engine speed versus fuel pulse width characteristic 41 of FIG. 3a. This particular S-shaped curve is shown for illustrative purposes as being generated by a series of straight line segments. A more detailed portrayal of the technique utilized for DDA1 and DDA3 is shown in FIG. 5 with the resulting characteristic generated shown in FIG. 6.

For any given straight line segment the appropriate equation is:

$$T = MS + T_o \tag{2}$$

where:
$T$ = the fuel pulse width
$S$ = engine speed
$M$ = curve slope
$T_o$ = initial pulse width value used to start off the interpolator.

The derivation of T is first obtained as follows:

$$dT = Mds \tag{3}$$

Substituting this into equation (1), the equation (4) is obtained.

$$T_{i+1} = T_i + M\Delta S \tag{4}$$

Equation (4) indicates that each new value of pulse width for each delta of speed is obtained by simply adding the slope to the present value of T, providing $\Delta S = 1$. If the map 41 of FIG. 3 for engine speed versus pulse width is rederived in terms of time per engine rpm rather than engine speed, one may then substitute $\Delta P$ in the place of $\Delta S$ for the straight line segments in equation (4), where P is the engine period equal to 1/S.

$$T_{i+1} = T_i + M\Delta P \tag{5}$$

The substitution in equation (5) is possible because when the characteristic is re-plotted in terms of time per engine revolution (engine period), the resulting characteristic can still be represented by a series of straight line segments.

The implementation of equation (5) is effected by the DDA interpolator which, as illustrated in FIG. 5, comprises a scale register SR1, an R register R1, and a pulse width register R2, each of these registers being a suitable conventional shift register, eight-bits in the present embodiment. The contents of the scale register SR1 are enabled through an AND gate 140 to one input A of a first full adder FA1 and are combined therein by either addition or subtraction with the contents of R register R1. Such combination is effected for a number of successive iterations determined by duration of the EPP pulse enabling gate 140 which in turn is determined directly from engine speed. The sum output of full adder FA1 is connected to the input of R register R1 to recirculate after each iteration the combined contents of scale register SR1 and R register R1.

When as the result of such combination in full adder FA1 the contents of R register R1 either exceeds a first predetermined or overflow value reflective of the number of stages comprising R1 or become less than the second predetermined or borrow value such as zero, a carry or borrow bit respectively is generated at the CY output of full adder FA1 and is communicated therefrom to one input of a second full adder FA2. The sum output of full adder FA2 is communicated to the B input of the pulse width register R2, the output of which is communicated to the A input of full adder FA2 for combination thereby with the output pulse provided by the CY carry output of full adder FA1. As the result of the combination of the contents of the pulse width register R2 with the carry output from full adder FA1 in full adder FA2, the contents of the pulse width register R2 are accordingly increased or decreased. The read only memory ROM 1 is provided for storing information defining the slopes and intersections of the various segment portions defining schedule 41.

Upon the initiation of each computation cycle, the DDA interpolator is by suitable control signals established in initial condition wherein an initial slope value, M1 for example, is transferred by suitable memory accessing means (not shown) from a known slope location in ROM 1 to scale register SR1. Concurrently, an initial pulse width value is transferred from a known start point location in ROM 1 to pulse width register R2. A suitable comparator device CP1 is provided to compare the contents of the pulse width register R2 with the contents of a known end point location in ROM 1, for example, point 1 indicated on schedule 40 of FIG. 6. When the contents of the pulse width register R2 equals the contents of the first end point or intersection location of read-only memory ROM 1, comparator device CP1 issues an output pulse to a memory location selection device in the form of a binary counter BC1 causing the contents of a second memory slope location to be inserted into scale register SR1 and a second memory intersection or breakpoint location to be made available to comparator CP1. The contents of the pulse width register R2 however are not changed as the result of the indicated slope change but is changed only at the start of a computation cycle or as the result of a sum output from the second full adder FA2.

In the context of implementing equation (5), each $\Delta P$ in equation (5) is represented by an EPP pulse in FIGS. 5 and 6 and each EPP pulse comprises an engine speed dependent number of groups of LCLK clock pulses from a high frequency clock oscillator. These pulses are enabled into full adder FA1 of FIG. 5. Thus, each EPP pulse ($\Delta P$ in equation (5)) causes register SR1 to add to register R1 and the sum to circulate back into R1 for a number of iterations determined directly from the duration of the EPP pulse, each such iteration being effected by one of the groups of LCLK pulses. Interpolation process is stopped at the end of some predetermined fraction of an engine revolution. Thus, the engine period determines how far along the speed versus pulse width characteristic 41 of the DDA1 interpolator progresses before it is stopped. At the receipt of each pulse a value equal to $M \times \Delta P$ (stored in register SR1) is entered into the adder to increase (or decrease) by that amount the number in R1. As the SR1 register is added to the R1 register, eventually the R1 register will overflow. This is detected as a carry pulse out of FA1. The carry pulses from FA1 are added to register R2 via FA2. Thus, register R2 will contain the major part of the interpolation results while register R1 will contain the minor part. From the examples shown in FIGS. 5 and 6, the interpolator would start out with the initial value $T_0$ loaded into R2 and the initial slope of the first line segment M1 loaded in SR1. The interpolator would then interpolate until the contents R2 were compared with another portion of the read-only memory word coming from the ROM 1. When the value of R2 was found to be equal to $R2_1$, the binary counter BC1 would be indexed thereby addressing the next ROM cell location. The next ROM cell would then place the slope M2 into the SR1 register and the value of $R2_2$ into the A input of the comparator CP1. Thus, during this phase of the interpolation, each time pulse would cause the incrementing of the interpolated result by the value M2. The interpolator would move along the M2 portion of the curve until a value $R2_2$ had been built up in the R2 register. At this point, the BC1 counter would again be indexed and the next ROM word addressed, whereupon M3 would be placed in the SR1 register and $R2_3$ would appear at the A input of the comparator. Thus, in this example, the interpolator can be made to automatically progress along each straight line segment with the interpolation parameters automatically changing at the end of each segment.

As compared to prior fuel injection interpolation schemes wherein the interpolation points are based on and digitally coded to provide equal increments along the curve, there the number of words required by the apparatus being determined by the sharpest curvature portion of the curve, equal increments are not required with the apparatus of the present invention, and therefore, fewer words of memory are required.

It is noted that the function provided by the combination of R2 and FA2 could also have been provided by a binary counter to store the overflows from the interpolator. However, since the interpolation performed by DDA 1 in FIG. 4 must of necessity preceed the interpolation performed by DDA 2, the register and full adder from DDA2 may be time-shared to provide the necessary register and full adder to store overflows from DDA1. Thus, the use of the register and full adder in FIG. 5 is consistent with the desirability of providing a minimal amount of hardware.

DESCRIPTION OF FIG. 7 NONLINEAR INTERPOLATOR

As an example of nonlinear interpolation, consider the generation of the manifold pressure pulse width characteristic 51 of FIG. 3a. The prior interpolation by DDA1 along the engine speed contour 41 resulted in the starting point value for the interpolation along the manifold pressure pulse width contour 51. This number is used as the initial value in interpolator DDA2.

Empirical data of actual engines have indicated that the manifold pressure pulse width contour has the general mathematical form of equation (6).

$$T = AB^P \tag{6}$$

where $T$ is the pulse width in milliseconds, $A$ is the axis intercept or pulse width for zero torr pressure, $B$ is a constant which is a function of the engine design and $P$ is the manifold pressure. In order to provide a digital differential analyzer solution for equation (6) we must first differentiate:

$$dT = A(LnB)B^P dP = T(LnB)dP \tag{7}$$

substituting equation (7) into equation (1) we have the following DDA equation for the above function:

$$T_{i+1} = T_i + (LnB)T_i \Delta P \tag{8}$$

For one specific V8 engine, the value of LnB was found to be equal to 0.09375; thus, equation (8) becomes:

$$T_{i+1} = T_i + 0.09375 \, T_i \Delta P \tag{8.1}$$

The constant 0.09375 may be factored as follows:

$$T_{i+1} = T_i + (2^{-4} + 2^{-5})T_i \Delta P \tag{8.2}$$

Or more generally:

$$T_{i+1} = T_i + (r^{-n_p} + r^{-n_q})T_i \Delta P$$

where r is the radix of the counting system being used and $n_p$ and $n_q$ are the properly selected powers, here 4 and 5 respectively, to which the radix is raised.

Thus the product of the current value of fuel pulse width times the constant 0.09375 may be obtained by shifting the present value of T four places in the direction of the least significant bit and adding that to the value of T shifted five places in the same direction.

A detailed illustration of the interconnection of registers and adders comprising DDA 2 to perform the solution to equation (8.2) is shown in FIG. 7. For purposes of illustration, the assumption is that each register contains m, here eight, individual storage flip-flops or stages. The initial value of pulse width as computed by DDA 1 is entered into the left-hand side of the serial register R2. Register R2 in accordance with the present invention provides a virtual shift of n places, here four and five, respectively to the left and thereby avoids the time it takes to provide actual shifting. At the start of the iteration, the least significant bit appears at the output of each register, (cell or stage no. 1). However, note that on command, the full adder FA3 sums the first bit of R2 with the jth or 5th bit of R2, and full adder FA2 sums the fourth bit of R2 with the sum output of FA4 recirculating the result back into R2. Thus the least significant bit of R2, i.e., the current value of pulse width, is summed with the 4th and 5th bit positions thereby creating a virtual shift in the number 4 and 5 places to the left.

$\Delta P$ may be obtained as a series of high frequency clock pulses used to measure the period of the astable multivibrator (ASM1 in FIG. 4). The frequency of ASM1 is controlled by a variable capacitance pressure transducer in which it is assumed for purposes of illustration here that the capacitance variation is linear with respect to absolute pressure. Thus, DDA 2, by solving equation (8.2) serves to provide a pulse-by-pulse solution for the manifold pressure-pulse width characteristic 51.

Since the digital differential analyzer is solving a multiplication function, the answer will contain twice as many significant bits as the original numbers. The major or upper significant portion of the answer is detected as the carries at the end of the iteration of either adder FA3 or FA4 and is entered into storage element R3. At the end of the computation iteration, R3 contains the particular pulse width of fuel corresponding to the point of engine speed and manifold pressure last measured. Element R3 can be either a counter or a register. However, during the computation DDA2, DDA1, is not being utilized, and therefore, the SR1 register and FA1 adder from FIG. 5 may be time shared and utilized as the R3 elements in FIG. 7, thereby providing hardware reduction through time sharing techniques.

The generation of the temperature enrichment factor 60 of FIG. 3b is accomplished by the same process as the computation of the schedule 41 of FIG. 3a. Thus DDA3 first interpolates the manifold pressure enrichment contour 62. This can be accomplished by a linear sement read-only memory controlled DDA interpolator or if applicable, by a nonlinear technique such as that illustrated by DDA2. The end interpolation point of DDA3 is used as the starting interpolating point for DDA4, a nonlinear interpolator used to track the coolant temperature versus enirchment factor characteristic 64. The two pulse widths versus enrichment factor characteristic 64. The two pulse widths obtained from DDA2 and DDA4, respectively, are then summed by the adding element MJ and placed in the 4 monostable multivibrators.

By rederiving the temperature enrichment schedule specified by FIG. 3b into an additive enrichment factor rather than a multiplication enrichment factor, computation time penalty associated with the multiplication of the DDA2 interpolated quantity times the DDA4 interpolated quantity is avoided. Instead, the output of DDA4 is summed by mixing junction MJ with the output of DDA2. The correction factor of FIG. 3b can be rederived to be an additive factor rather than a multiplicative factor as follows: (1) At the indicated engine speed, plot the corrected fuel pulse width versus manifold pressure and coolant temperature; and (2) Graphically transform the coordinates such that the zero point on the fuel pulse width axis corresponds to the plane intersecting the three-dimensional surface at 180°F. The resulting curve is a plot of the additive correction factor.

DESCRIPTION OF FIGS. 9–10 CONTROL LOGIC

The CONTROL LOGIC block of FIG. 4 serves to derive interpolation command signals for the four interpolators from the engine speed sensor pulses and ASM1 and ASM2 pulses. The CONTROL LOGIC utilizes conventional AND Gate, OR Gate and Flip-Flop logic elments in order to produce waveforms in accordance with the timing diagram of FIG. 11. In FIG. 11 the engine speed pulses are shown for an eight cylinder engine and occur four times per engine revolution.

During one half of an engine revolution, the INT1 signal is derived synchronous with the trailing edge of the engine speed pulses. INT1 serves to command the interpolation of DDA1 along the contour as illustrated in FIG. 3a. During the same half of the engine revolution, the INT3 signal is generated from the ASM1 pulses. Note that the period of the ASM1 pulses is equal to $$\frac{1}{K1 \cdot \text{the manifold absolute pressure } (MAP)}.$$

The INT3 signal enables DDA3 to interpolate along the contour as illustrated in FIG. 2b. During the second half of the engine revolution, the INT2 and INT4 signals are derived from the ASM1 and ASM2 pulse trains respectively. Note that the ASM2 pulse period is equal to $$\frac{1}{K2 \cdot \text{engine coolant temperature } (T_W)}.$$

INT2 serves to command DDA2 to compute along the contour as illustrated in FIG. 3b. INT4 serves to command DDA4 to compute along the contour as indicated in FIG. 3b.

The speed override logic unit SOL in FIG. 4 serves to modify the coolant temperature enrichment schedule as a function of engine speed. Note in FIG. 3c that engine cranking requires greater fuel enrichment than normal engine idling. Furthermore, while it is not shown in FIG. 3c, the engine warmup enrichment may be overridden as the speed of the engine becomes significantly greater than the idle speed. The SOL logic serves to modify the interpolation parameters of DDA4 during engine cranking in order to provide the required additional enrichment. In addition, when the engine operating speed is above some predetermined preset threshold value, the warmup enrichment is overriden. In this case, the DDA3 and DDA4 computation output would be forced to O thereby effecting operation of the engine along the three dimensional contour of FIG. 3a only.

The CL3 block of FIG. 4 utilizes standard AND gates, OR gates and flip-flops in order to derive the IA, IB, and I1 through I4 control signals from the engine speed and phase pulses (see FIG. 11). The logical one state of IA causes one bank of four injector solenoids to be selected while the logical one state of IB effects selection of the alternate injector bank. Note that IA and IB are switched synchronously with the trailing edge of the first engine phase pulse in a revolution. The four engine phase pulses immediately following the first pulse in a revolution are gated as signals I1 through I4 respectively to set flip flops FF1 through FF4 respectively. FF1 through FF4 are each set for a time duration $T_F$, which was computed during the previous engine revolution by the joint action DDA1 through DDA4.

The engine speed and phase pulses shown in FIG. 11 may be obtained by several methods. One would be to use an Airpax Model 4-0001 Zero Velocity Digital Pickup to pickup traverses of the teeth of an engine ring gear. Another would be to use a conventional engine ignition distributor with a second set of contact points (to provide electrical isolation from the ignition circuit) following the normal distributor cam. The width of the pulses may then be adjusted by setting the point gap (dwell angle). The engine sync pulse may be obtained from a mechanical switch which is operated once per revolution of the ignition distributor shaft (once per two revolutions of the engine). The engine sync pulse serves to synchronous the control logic to the engine cycle (for example: cylinder number 1 at top-dead-center of compression stroke).

FIGS. 9 and 10 portray the interconnection of standard logic elements in order to accomplish the signal timing illustrated in FIG. 11. Elements 401, 403, 405, 406, 407, 408, 418, 420, 426, 428, 431, 432, 433, 434, 441, 442, 445 through 448, and 450 are D type flip-flops such as the RCA CD4013AD circuits. AND Gate elements 402, 409 through 412, 415, 416, 427, 430, 435, 450, 443, 444 and 449 may be constructed by the interconnection of NOR or NAND Gate elements such as the CD4000AD, CD4002AD, CD4012AD, CD4025AD, CD4023AD, CD4001AD, and CD4011AD integrated circuits. The OR Gates 404, 413, 414 and 417, and inverter elements 419, 421, 424, 429, 436, and 437 may also be constructed from the aforementioned NOR and NAND Gate circuit elements. Elements 422, 423, and 438 are standard resistance elements. Element 440 is a standard capacitance element. Element 425 represents a variable capacitance transducer such as a Model 240 Serta miniature pressure transducer obtainable from Serta Systems Inc., Natick, Mass., while elment 439 represents a variable resistance transducer.

Referring to FIG. 9, elements 401, 402, and 403 serve to synchronize the engine speed pulses to the high speed LCLK signal. The LCLK signal serves as a logic clock for the system and is derived from a standard 500 KHz square wave oscillator as illustrated in FIG. 8. In order to facilitate the serial arithmatic implementation used here for illustration, the LCLK pulses are divided into groups of eight by PSRI of FIG. 8. The first clock pulse of each group is used to signify that the least significant bit of a shift register such as R2 of FIG. 7 is being arithmetically operated upon by adders such as FA3 and FA4 of FIG. 7. The second clock pulse in each group of eight signifies that the second least significant bit is being arithmatically operated upon by the adders, the whole arithmatic word having been shifted one place to the right in R2 by the LCLK signal and the least significant bit having been recirculated into cell number 8. The aforesaid groups of eight LCLK pulses are defined as the arithmatic iteration, which starts with the 0 to 1 transition of T8 (see FIG. 8). All interpolation processes must be started and ended synchronously with the arithmatic iteration in order to avoid an erroneous shift in significance of the numbers contained in the interpolators. Elements 401, 402, and 403 produce a Elements 401, 402, and 403 produce a single two microsecond pulse from the leading edge of each engine pulse from the engine phase transducer. Elements 404 through 412 serve to separate the individual engine speed pulses and to identify them with respect to the engine synchronization pulse in order that specific commands may be obtained for the individual injector solenoids. The LCLK oscillator signal is processed through a shift register as illustrated in FIG. 8a in order to obtain the iteration clock for the 9 bit serial arithmetic implementation (see FIG. 8). Note in FIG. 8b that the upgoing edge of the T8 signal serves to indicate a start of each new arithmetic iteration. Elements 413 through 419 of FIG. 9 serve to generate the INT1 signal in accordance with the timing of FIG. 8 and synchronous with the arithmetic iteration of the system. Element 420 serves to generate the IA and IB signals in accordance with the timing of FIG. 8.

Referring to FIG. 10, element 421 through 425 comprise the astable multivibrator circuit No. 1 (ASM1). Element 425 represents a variable capacitance transducer used to convert some physical parameter of the engine into a variable capacitance, thereby varying the output frequency of ASM1. In this example, elment 425 is the variable capacitance absolute manifold pressure transducer. Element 426 serves to synchronize the pulse output of ASM1 to the high speed LCLK clock signal. Elements 427 and 428 effect the generation of a single 2 microsecond pulse coincident with each ASM1 pulse and the start of an arithmatic iteration. The aforementioned pulse is utilized as the clock input for elements 431 through 434. Elements 430 through 432 serve to generate the INT2 signal, in accordance with the timing illustrated in FIG. 11. Elements 433 through 435 serve to generate the INT3 signal in accordance with the timing illustrated in FIG. 11 Elements 436 through 440 form a second astable multivibrator in which the physical transducer is a variable resistance element portrayed by element 439. In this case, the physical transducer may be the engine coolant temperature in which case element 439 would be a thermister transducer. Elements 440 through 443 serve to synchronize ASM2 pulses with the 500 KHz LCLK signal and to generate a single 2 microsecond pulse for each ASM2 pulse and synchronous with the start of an arithmetic iteration. Each of the aforementioned 2 microsecond wide pulses is utilized as the clock input to flip flop elements 445 through 448. Elements 444 through 446 serve to generate the INT4 signal in accordance with the timing of FIG. 11. Elements 447 through 449 serve to generate INT5 signal in accordance with the timing in FIG. 11. Elements 450 and 451 serve to generate a single iteration ADD command immediately following the INT2 signal and in accordance with the timing of FIG. 11.

FIGS. 12 – 14 DESCRIPTION

Where necessitated by accuracy requirement, the pulse width manifold pressure characteristic 60 of FIG. 3c may be generated by a multiple segment nonlinear interpolator such as illustrated in FIG. 12 to effect an alternative schedule of the type shown for one specific engine in FIG. 14. The points plotted in FIG. 14 represent the actual desired engine operating points of manifold pressure and fuel pulse width. Since the schedule is most closely approximated by Equation (6), the data of FIG. 14 is plotted on a semi-logrithmic scale in order that the resulting equations will plot as straight lines. The single segment approximately constructed through to the points does not pass within one percent of all data points. In some specific areas, such as 500 to 550 torr pressure and 650 to 700 torr pressure, the data points lie more than 1% off of the curve. In this specific application it is desirable that the generated function track the engine operating points within 1% of point accuracy.

The equation of the single segmented curve was derived to be:

$$T = 1.32 \, (0.9748)^P \quad (9)$$

and the digital differential analyzer equation for generation of the sinle approximation was derived to be:

$$Y_{(x_{i+1})} = Y_{x_i} + 0.002 \, Y_i \quad (10)$$

wherein the constant multiplication factor of 0.002 in Equation (10) represents a combination of the product of $\Delta P 1nB$. In this particular case, $\Delta P$ was derived to be equal to 0.0784 torr in order that the least significant bit of the result would represent 0.02 milliseconds, the 0.02 milliseconds pulse width resolution being necessary to guarantee generation of the required 1% of point accuracy in the neighborhood of 180 torr.

The 3-lines in FIG. 14 indicate that all points lie within 1% of one of the three lines. The three lines together represent a single segmented approximation of the pulse width manifold pressure function. Thus, a single interpolator which is capable of following the discontinuous function represented by segmets 1, 2, and 3 is required in order to generate the pulse width manifold pressure function to the desired degree of accuracy. The interconnection of logical elements to form such an interpolator is shown in FIG. 12. The digital differential analyzer equations to be generated for each segment are shown in FIG. 14. These were derived graphically from the dashed line segment approximating the data points. The constant multiplication factors in each equation were based on a $\Delta P$ of 0.08114 torr. This results in a minimum resolution for $\Delta T$, the fuel pulse width, of 0.02115 milliseconds.

The array of computing elements illustrated in FIG. 12 can be classified as a discontinuous nonlinear digital differential analyzer function generator with stored arbitrary interconnections. The computing elements consist of a shift register designated SR1 consisting of nine cells arranged so as to sequence information serially from left to right through the register. Note that while the specific problem illustrated here requires the use of 9 bits in the arithmetic word, other implementation schemes and problems may use more or fewer bits in the arithmetic word, depending upon the accuracy required of the application. The information in SR1 is indexed 1 bit position to the right each time the logic lock signals LCLK changes from the high to low state. SR1 contains the minor portion (lower significant 9 bits) of the computed fuel pulse width. A second shift register SR2 is identical to SR1 and contains the major portion (upper significant 9 bits) of the computed fuel pulse width. The contents of SR2 represent the number which at the end of computation would be summed with DDA4 and transferred to MSM1, 2, 3 and 4 as shown in FIG. 4 for each segment of the curve (see FIG. 14). The constant multiplication factor is factored to within 1% accuracy into powers of 2 as shown in Equations (11), (12), and (13) below.

$$0.001768 = 2^{-9} - 2^{-13} - 2^{-14} \quad (11)$$

$$0.001953 = 2^{-9} \quad (12)$$

$$0.00264 = 2^{-9} + 2^{-11} + 2^{-12} - 2^{-15} \quad (13)$$

The above process allows the constant multiplication to be performed by shifting the current value of computed pulse width and summing it with itself in order to obtain the next computed pulse width value. Thus, each incremental pulse width is obtained by a series of bit shift and add or subtract operations. The bit shifting is accomplished virtually rather than actually by the connection of cells from SR2 via the gates A6, A1, A2, A3, 01, A4, A5, and 02 to the FA6, FS1, FAS1, and FAS2 computing elements. The full adder FA6, full subtractor FS1, and full adder-subtracters FAS1 and FAS2 serve to accomplish the add and subtract operations indicated to be necessary by equations (11), (12), and (13). At the end of each 9 bit computation iteration, the CL1 control logic element designated CL1 detects overflow bits from the interpolation. These overflows are added into the major portion of the fuel pulse width number, contained in SR2, via computing element full adder FA5. The increment of pulse width is enabled to be added to the contents of SR1 continuously during the interval between two ASM1 (see FIG. 7) pulses. This interval is indicated in FIG. 12 to be the INT signal. The ROM indicated in FIG. 12 contains, in this example, a three word, 14 bit binary word to control the size of increment used for interpolating each cruve segment, control the location of the discontinuities between curve segments, and control the operating mode (add or subtract) of FAS1 and FAS2.

Bits B0, B1, and B2 of the ROM3 are used to enable gates A1, A2, A3, A4, and/or A5. Bits B0 through B2 thereby control the size of fuel pulse increments which in turn controls the slope of the segment being generated in FIG. 14. Bits B3 and B4 serve to program the operational mode of the full adder-subtractor circuits FAS1 and FAS2. Bits B5 through B13 are compared by comparator circuit CP3 with the contents of SR2. When the two numbers are equal, counter BC3 is indexed 1 count. BC3 serves to provide the address to the ROM. Thus, each time a discontinuity in the function is reached a new word is addressed in the ROM, thereby effecting the selection of a new control word, B0 through B4, and discontinuity location word, Bits 5 through Bits 13. The timing generator 300 serves to provide signals T3 through T7 which control gates A1 through A5. The purpose of these signals is to prevent erroneous numbers, caused by the virtual shift operation, from entering the computing elments.

Considering now the generation of segment 1 shown in FIG. 14, the appropriate shift and add or subtract operations are designated in Equation (11) in order to produce the multiplication factor of 0.001768. Note that the shift and add operations indicated in Equation (11) do not produce the exact multiplication factor but are accurate to within 1%. At the end of interpolation of DDA1, a number would be stored in SR1 and SR2 representing the computed fuel pulse width for a manifold pressure of 0 torr. This can be read graphically from FIG. 14 to be 1.44 milliseconds for an engine speed of 1200 rpm. At this time a control signal would be generated to signify the end of interpolation of DDA1 and this would allow the INT signal to be generated to DDA2, thereby starting the interpolation. The address provided by BC3 to the ROM3 would consist of all 0's thereby addressing word number 0. B0, B1, and B2 from the ROM would all be in the logical 0 state thereby enabling gates A2 and A4. During the arithmetic iteration, the least significant bit of SR1 would enter FA6 during the first clock of the iteration (see FIG. 13). Gate A6 would allow the least significant bit of SR2 to enter the input of FA6. Since the least significant bit of SR2, representing the major portion of the fuel pulse width, is added to the least significant bit of SR1 representing the minor portion of the fuel pulse width, this has the effect of multiplying the fuel pulse width by $2^{-9}$ and adding it to itself. The sum formed in full adder FA6 would be passed into the full subtractor FS1. Since the B input of full subtracter FS1 is set at 0 throughout the iteration, because Gate A1 is disqualified by the 0 state of B0, the sum occurring at the output of full adder FA6 would also occur at the output of FS1. The output of FS1 is connected to the A input of the FAS1. Bit B3 in ROM3 would be at the 0 state thereby programming FAS1 to subtract the B input from the A input. Gate A2 passes cell 6 of SR2 via gate 01 to the B input of FAS1. During the first clock period the contents of cell 6 of SR2 is the sixth least significant bit of the major portion of the fuel pulse width (see FIG. 13). This is equivalent of shifting the major portion of the fuel pulse width 14 bits to the right and then entering it into FAS1. Thus the sum output of FAS1 will be (the contents of SR1) + $(2^{-19} - 2^{-14})$ times (the contents of SR20. The result is passed to the A input of FAS2 which is also programmed, by the logical 0 state of ROM bit B4, to be a subtracter. Gate A4 passes cell 5 of SR2 via gate 02 into the B input of FAS2. The resulting number at the sum output is SR1 + $(2^{-9} - 2^{-13} - 2^{-14})$ · SR2. This number is shifted into cell 9 of SR1 at the end of clock 1. The corresponding bits which are added to each other in the remaining 8 clock periods can be deduced from the timing diagram shown in FIG. 13. Note for example, that, during the second clock period time, the second least significant bit of SR1 is added to the second least significant bit, the sixth least significant it, and the seventh least significant bit of SR2. Note that the contents of cell 6 of SR2 are gated into FAS1 only during the duration T4. This control gating serves to generate all 0's for bits beyond the most significant bit and, thereby, prevent the least significant bit through the fifth least significant bit from being entered into FAS1 and being interpreted as higher significant bits by the computing elements. The control signals, T3, T5, T6 and T7 on gates A1, A3, A4, and A5 serve a similar purpose.

Thus one can see from the above description that the interpolator shown in FIG. 12 starts at manifold pressure = 0 and interpolates up segment 1 until the first point of discontinuity is reached. At this point a new ROM word is addressed, a new increment is enabled by the control gating, and a new discontinuity point is programmed. In addition, the mode of operation of FAS1 and FAS2 may be changed as is appropriate to generate the desired increment. Similarly the interpolator tracks along segment 2 of the curve generating appropriate increments until the INT signal goes to the logical 0 state or the second discontinuity is reached. Upon reaching the second discontinuity a new ROM word would be addressed, causing the interpolator to track along segment 3 of the curve of FIG. 14. Note that interpolation occurs for the duration between two pulses of ASM1 of FIG. 4. The time between pulses of ASM1 is directly proportional to the absolute manifold pressure expressed in torr. Thus, for example, if the manifold pressure were 400 torr, the interpolator would interpolate at a fixed iterative rate between the two ASM1 pulses. The time between these pulses would be set so that it would equal the time for the interpolator to compute the 400 torr point of FIG. 14.

While the interconnection of elements in FIG. 12 is shown for the generation of the specific functions in FIG. 14, other engines and other operating characteristics with the same engine may have a different shaped function, therefore, requiring variation in the interconnection of the computing elements. Furthermore, while the example shown in FIG. 12 was generated for the specific case of serial binary arithmetic, it is recognized that other implementations of the basic idea are possible utilizing other codes such as binary coded decimal, excess 3, and other forms of arithmetic interconnection such as parallel and serial parallel arrays.

FIGURES 15-19 DESCRIPTION

The ignition spark advance angle refers to the angular position of the engine crank shaft, in advance of a piston arriving at the top of the compression stroke, at which the spark is generated by the ignition spark control circuit.

The overall system concept for control of ignition spark advance is shown in FIG. 15. Engine speed, absolute manifold pressure, and coolant temperature are sensed by appropriate transducers, which convert the physical parameters to electrical signals. These electrical signals are then connected into a digital electronic computer which calculates the correct firing angle and pulse width of the ignition spark. The computer then generates control signals to the ignition circuit. The ignition circuit may take several forms. For the purpose of example here, a circuit shown in FIG. 18 corresponding in part to FIG. 1 of the commonly assigned U.S. Pat. to Loudon No. 3,240,198 issued Mar. 15, 1966 and entitled "Electrical Apparatus," such patent being hereby expressly incorporated herein by reference. The ignition circuit in conjunction with the ignition spark distributor then provides the required amplification of the computer control signal in order to produce the required ignition spark. A view of the physical arrangement of the cylinder and associated fuel injection and spark mechanisms is shown in FIG. 15. In the explanation that follows, the theory of operation of the ignition advance control computer will first be discussed. Following this, the tie-in of the control computer to the Ludon Circuit will be described.

Data published in the Wertheimer reference, supra, indicates that the control of the ignition spark advance will consist primarily of the solution of a three dimensional schedule involving two sensed engine parameters, such as absolute manifold pressure and engine speed. While the exact shape of the required contour is not yet known, data published implies the contour might well be simpler than that illustrated in FIG. 3a. The aforementioned data is plotted in FIG. 17 to illustrate the general form of spark advance schedule which is expected to be required. By inspection of FIG. 17 one can see that the spark advance as a function of engine speed is expected to be a discontinuous but linear function. The manifold pressure vs. ignition advance angle characteristic is expected to be of the form $Y = A \cdot B^x$. Thus, one can see that a solution of the ignition advance schedule can quite probably be obtained by the use of DDA techniques such as have been previously described in this disclosure.

A more detailed presentation of the concept of the ignition advance control computer is shown in FIG. 18. The ASM1 and ASM2 circuits in FIG. 18 may be the same circuits as shown in FIG. 10 and may be time-shared with the fuel pulse width computer. The engine pulses would be obtained with a time relationship as shown in FIG. 11. DDA6 and DDA7 serve to obtain the real time solution of the ignition advance schedule in a manner similar to that described for DDA1 and DDA2 of the fuel injection computer. DDA5 serves to compute a temperature correction factor in order that further correction of the engine advance angle may be made as some, as yet unspecified, function of engine coolant temperaure. The adder element is a serial binary adder, used to combine the scheduled ignition advance angle with the temperature correction. This adder element can be provided by standard circuits such as the RCA CD4038AD. The storage register element provides for storage of the computed ignition advance angle while a new value is being recomputed. The value of ignition advance angle contained in the storage register is utilized in a presetable up/down counter in order to provide the delay from the engine phase pulse to the actual point in time when the ignition spark is initiated. Counter control logic provides the necessary combination of standard AND Gate, OR Gate, and flip-flop elements so as to effect the transfer of the information of the storage register to the presetable up/down counter, the gating of clock pulses to step the counter and the computation of an additional factor representing the ignition spark pulse width. Transistor elements Q1 and Q2 and transformer element T1 serve to provide the necessary interfaces between the control computer and the Loudon Circuit. The storage register function may be provided from standard circuits by use of 1 or more RCA CD4058AD circuits. Counter control logic would be constructed in a manner similar to the logic shown in FIGS. 9 and 10 from conventional AND Gate, flip-flop and inverter circuits. The presetable up/down counter element may be provided by the standard Motorola MC14516AL counter circuit.

The operation of the system shown in FIG. 18 will now be explained. The engine pulses are obtained in the same manner as previously explained for the fuel injection system. The mechanical arrangement of the distributor is designed to be such that the engine phase pulses occur at the maximum advance angle of approximately 30°. Three periods of sequential operation occur. During time period one, the INT1 signal of FIG. 4 is used to enable the computation of DDA6. Simultaneously, the INT5 signal of FIG. 11 is utilized to enable the interpolation of DDA5. At the end of Time 1, the number computed by DDA6 is transferred to DDA7 and utilized as the initial interpolation point. The number computed by DDA5 is retained in the DDA5 until Time 3. During Time 2, the INT2 signal of FIG. 11 enables the computation of DDA7. At the end of interpolation of DDA7 and ADD command is generated, synonymous with Time 3, as illustrated in FIG. 11. This ADD command causes the number computed by DDA7 and the number computed by DDA5 to be summed and transferred to the storage register element. Thus, during each engine revolution an advance angle is computed and inserted in the storage register element for use by the engine during the next revolution.

The counter control logic of FIG. 18 functions as follows. Any time an engine phase pulse is received, the two microsecond wide pulse generated by logic elements 1, 2, and 3 of FIG. 9 is utilized in conjunction with appropriate gating to transfer the contents of the storage register to the presetable up/down counter. This same pulse is also utilized to set a flip-flop which then enables the 500 KHz LCLK signal to count the counter down to 0 counts. Thus, the number stored in the storage register is 30° minus the engine advance angle, expressed as a number of LCLK pulses. Standard gating within the presetable up/down counter element, detects when the counter is at 0. This condition, in conjunction with the aforementioned control flip-flop having been set, causes, by means of an AND gate, the spark ON signal to be generated to the base of Q1. The spark ON signal is also utilized to reset the aforementioned control flip-flop to transfer the pulse width interpolation number into the presetable up/down counter and to set a second control flip-flop which allows the LCLK 500 KHz signal to count down the counter. The second time the counter reaches the 0 count, a spark OFF signal is generated and the second control flip-flop is reset. The pulse width number is obtained by a second presetable up/down counter, contained within the counter control logic box of FIG. 18, which counts the number of LCLK pulses occurring between each pair of engine phase pulses. Thereby the pulse width of the ignition firing pulse becomes a linear interpolation function of the engine speed.

Thus, the function of the aforementioned circuit is to generate an ignition spark at a prescribed advance angle by computing the advance angle as a function of the number of 500 KHz clock signals from the engine phase pulse. A counter is used to determine when said number of pulses have occurred and a firing pulse should be initiated. Similarly, a second number in the same counter is utilized to determine the width of the ignition pulse and provide the spark off signal to the Loudon Circuit.

The interface of the aforedescribed ignition advance control computer into the Loudon Circuit will now be discussed. Referring to FIG. 19, the transformer secondary of T1 in FIG. 18 is connected as indicated, in place of the pulse generating wheel and coil, to the wires 536 and 537. Thus, the spark ON signal couples a positive pulse on wire 536 with respect to 537 so as to trigger element 545, thereby effecting the ignition spark as described in the Ludon Patent. To turn off the Loudon Circuit, thereby providing pulse width control, element Q2 of FIG. 18 is connected to wire 564. This effectively shorts out capacitor 529 thereby discharging it and terminating the spark signal to the spark plug. Note that the start wheel of the Loudon Circuit with appropriate modifications may also be utilized for generating the engine phase and synchronization pulse required by this disclosure.

SUMMARY

An engine control apparatus is provided for controlling an internal combustion engine control device in accordance with a pulsed control signal, the control device being of the type used in a fuel injection system or ignition advance system. The pulsed control signal has an incrementally variable pulse width determined in accordance with a first engine parameter and a second engine parameter. The engine control apparatus comprises means for generating a first engine parameter dependent number of clock pulses varying with the first engine parameter and for generating a second engine parameter dependent number of clock pulses varying with the second engine parameter.

First DDA interpolating means are provided for interpolating from a first start point value to a first pulse width value in accordance with a first predetermined engine characteristic for a number of first iterations varying with the first engine parameter dependent number of clock pulses. This first engine characteristic comprises a first segment and a second segment. The first segment comprises a slope breakpoint and a first slope portion including the first start point value and the slope breakpoint, and the first slope portion defines a first predetermined rate of change of the first pulse width values with values of the first engine parameter. The second segment is defined by the slope breakpoint and a second slope portion including the slope breakpoint. The second slope portion provides a second predetermined rate of change of the first pulse width values.

Second DDA interpolating means are provided for interpolating from a second start point value to a second pulse width value in accordance with the second predetermined engine characteristic for a number of second iterations varying with the second engine parameter dependent number of clock pulses. The second predetermined engine characteristic comprises the formula:

$$T_{i+1} = T_i + (\ln B)T_i \Delta P$$

wherein:

$T_i$ and $T_{i+1}$ are successive second pulse width values;
$\Delta P$ is the change in values of the second engine parameter between said successive pulse width values; and $\ln B$ comprises a factor having a value of $2^{-n}$.

Control means are provided for establishing one of the first and second start point values at one of said first and second pulse width values. And utilization means are provided for generating the pulsed control signal in accordance with the other of the first and second pulse width values.

Having described several embodiments of the invention, it is understood that the specific terms and examples are employed in a descriptive sense only and not for the purpose of limitation. Other embodiments of the invention, modifications thereof, and alternative thereto will be obvious to those skilled in the art may be made without departing from my invention. I, therefore, aim in the appended claims to cover the modifications and changes as are within the true scope and spirit of my invention.

I claim:

1. An engine control apparatus for controlling an internal combustion engine control device in accordance with a pulsed control signal having an incrementally variable pulse width determined in accordance with a first engine parameter and a second engine parameter, said engine control apparatus comprising:
   a. means for generating a first engine parameter dependent number of clock pulses varying with said first engine parameter and a second engine parameter dependent number of clock pulses varying with said second engine parameter;
   b. first DDA interpolating means for interpolating from a first start point value to a first pulse width value in accordance with a first predetermined engine characteristic for a number of first iterations varying with said first engine parameter dependent number of clock pulses, said first engine characteristic comprising a first segment and a second segment;
   c. second DDA interpolating means for interpolating from a second start point value to a second pulse width value in accordance with a second predetermined engine characteristic for a number of second iterations varying with said second engine parameter dependent number of clock pulses, said second predetermined engine characteristic comprising the formula $$T_{i+1} = T_i + (\ln B)T_i \Delta P,$$

wherein
   1. $T_i$ and $T_{i+1}$ are successive said second pulse width values,
   2. $\Delta P$ is the change in values of said second engine parameter between said successive pulse width values, and
   3. $\ln B$ comprises a factor having a value of $2^{-n}$;
   d. control means for establishing one of said first and second start point values at one of said first and second pulse width values; and
   e. utilization means for generating said pulsed control signal in accordance with the other of said first and second pulse width values.

2. The engine control apparatus of claim 1, wherein one of said first and second engine parameters comprises an engine load dependent parameter and the other of said first and second parameters comprises one of an engine speed dependent parameter and an engine temperature dependent parameter.

3. The engine control apparatus of claim 1 wherein said engine control device comprises one of a first injection control means and an ignition control means.

4. An engine control apparatus for controlling an internal combustion engine control device in accordance with a pulsed control signal having an incrementally variable pulse width determined in accordance with a first engine parameter and a second engine parameter, said engine control apparatus comprising:
- a. means for generating a first engine parameter dependent number of clock pulses varying with said first engine parameter and a second engine parameter dependent number of clock pulses varying with said second engine parameter;
- b. first DDA interpolating means for interpolating from a first start point value to a first pulse width value in accordance with a first predetermined engine characteristic for a number of first iterations varying with said first engine parameter dependent number of clock pulses, said first engine characteristic comprising a first segment and a second segment
  1. said first segment comprising a slope breakpoint and a first slope portion including said first start point value and said slope breakpoint, said first slope portion defining a first predetermined rate of change of said first pulse width values with values of said first engine parameter comprising one of a first and second ranges of first engine parameter values, and
  2. said second segment provided by said slope breakpoint and a second slope portion including said slope breakpoint, said second slope portion providing a second predetermined rate of change of said first pulse width values with values of said first engine parameter comprising the other of said first and second ranges;
- c. second DDA interpolating means for interpolating from a second start point value to a second pulse width value in accordance with a second predetermined engine characteristic for a number of second iterations varying with said second engine parameter dependent number of clock pulses, said second predetermined engine characteristic comprising the formula $$T_{i+1} = T_i + (\ln B) T_i \Delta P,$$

wherein
  1. $T_i$ and $T_{i+1}$ are successive said second pulse width values,
  2. $\Delta P$ is the change in values of said second engine parameter between said successive pulse width values, and
  3. $\ln B$ comprises a factor having a value of $2^{-n}$;
- d. control means for establishing one of said first and second start point values at one of said first and second pulse width values; and
- e. utilization means for generating said pulsed control signal in accordance with the other of said first and second pulse width values.

5. The engine control apparatus of claim 4, wherein one of said first and second engine parameters comprises an engine load dependent parameter and the other of said first and second parameters comprises one of an engine speed dependent parameter and an engine temperature dependent parameter.

6. An engine control apparatus for controlling an internal combustion engine control device in accordance with a pulsed control signal having an incrementally variable pulse width determined in accordance with a predetermined engine speed characteristic and a predetermined engine load characteristic, said engine control apparatus comprising;
- a. first pulse generating means for generating a train of clock pulses;
- b. second pulse generating means for generating a second pulse train of sequential second pulses separated by a second pulse train interval the duration of which varies with engine speed;
- c. third pulse generating means for generating a third pulse train of sequential third pulses separated by a third pulse train interval the duration of which varies with said engine load dependent parameter;
- d. control means for generating a first control signal and a second control signal, said first control signal comprising an engine speed dependent number of clock pulses varying with said duration of said second pulse train interval and said second control signal comprising an engine load parameter dependent number of clock pulses varying with said duration of said third pulse train interval;
- e. first DDA interpolating means responsive to said first control signal for generating first values of said pulse width varying in accordance with said engine speed dependent number of clock pulses and said predetermined engine speed characteristic, said engine speed characteristic comprising a first segment and a second segment
  1. said first segment defined by a slope breakpoint and a first slope portion including said slope breakpoint, said first slope portion providing a first predetermined rate of change of said first pulse width values with engine speeds comprising one of a first and second ranges of engine speeds, and
  2. said second segment defined by said slope breakpoint and a second slope portion including said slope breakpoint, said second slope portion providing said second predetermined rated of change of said first pulse width values with engine speeds comprising the other of said first and second ranges of engine speeds,
- f. second DDA interpolating means responsive to said second control signal and a said first pulse width value for interpolating from said first pulse width value to second pulse width values varying in accordance with said engine load parameter dependent number of pulses and said predetermined engine load parameter characteristic, said predetermined engine load parameter characteristic comprising the formula $$T_{i+1} = T_i + (\ln B) T_i \Delta P,$$

wherein
  1. $T_i$ and $T_{i+1}$ are successive said second pulse width values,
  2. $\Delta P$ is the change in values of said engine load dependent parameter between said successive pulse width values, and
  3. $\ln B$ comprises a factor having a value of $2^{-n}$; and
- g. utilization means for generating said pulsed combustion control signal in accordance with said second pulse width values.

7. The engine control apparatus of claim 6 wherein said first DDA interpolating means comprise:
- a. memory means comprising a start point location, a first slope portion location, a breakpoint location, and a second slope portion location, said memory locations respectively filled with contents comprising a start point, said first slope portion, said break point, and said second slope portion, b. first DDA register means comprising slope register means, R register means, and first DDA pulse width register means, said pulse width register means comprising operatively connected mth stage means and a jth stage means for each generating contents so that said contents generated by said mth stage means comprise said $T_i$ pulse width value and said contents generated by said jth stage means comprise a factor of $T_i$ including $T_i 2^{-n}$, said first DDA register means having an initial condition for interpolating in accordance with said first segment of said predetermined engine speed characteristic and a second segment condition for interpolating in accordance with said second segment of said predetermined engine speed characteristic, and said first DDA register means being initially established in said first segment portion when a control portion of said first control signal initializes the contents of said slope register means with said contents of said first slope location and initializes said contents of said first DDA pulse width register means with said contents of said start point location, c. first DDA iteration means for generating a number of first DDA iterations varying with said engine speed dependent number of clock pulses and for, in each said iteration, incrementing said contents of said R register means with said contents of said slope register means to generate first DDA incremented contents, filling said R register means with said first DDA incremented contents, generating a first DDA output pulse when the magnitude of said first DDA incremented contents is not within a predetermined range of magnitudes, and incrementing said contents of said first DDA pulse width register means with said first DDA output pulse, and d. means for comparing said contents of said first DDA pulse width register means with said contents of said breakpoint location and for establishing said first DDA register means in said second segment condition by filling said slope register means with said contents of said second slope portion location when said contents of said first DDA pulse width register means exceeds said contents of said first end point location, whereby said first DDA interpolating means interpolates in accordance with said predetermined engine speed characteristic for a number of iterations determined by said engine speed dependent number of pulses.

8. The engine control apparatus of claim 6 wherein said second interpolating means comprise:

a. second DDA pulse width register means comprising contents initialized by a control portion of said second control signal with said contents of said first DDA register means; and b. second DDA iteration for generating a number of second DDA iterations varying with said engine load parameter dependent number of clock pulses and for, in each said iteration, incrementing said $T_i$th value generated by said mth stage of said first DDA pulse width register means with said factor generated by said jth stage to generate second DDA incremented contents generating a $T_{i+1}$th value, recirculating said $T_{i+1}$th value to said first DDA pulse width register means, generating a second DDA output pulse when the magnitude of said second DDA incremented contents is not within a second predetermined range of magnitudes, and incrementing said contents of said second DDA pulse width register means with said output pulse, whereby said second DDA interpolating means interpolates in accordance with said predetermined engine load dependent characteristic for a number of iterations determined by said engine load dependent parameter number of pulses.

9. An engine control apparatus adaptable to control an internal combustion engine control device with a pulse signal the pulse width of which is incrementally variable by a variable number of constant width increments each effecting a predetermined pulse width versus engine speed relationship which comprises said variable number of increments intermediate a predetermined highest engine speed value and an actual speed value, defined respectively at an engine speed above the highest engine speed attainable and at the actual engine speed said engine control apparatus comprising:

a. means for generating an engine speed dependent number of pulses varying with the period in which said engine makes a revolution, b. means for commencing said predetermined relationship at said predetermined highest speed value and terminating at said actual speed value comprising means for generating said variable number of said increments from said engine speed dependent number of pulses.

c. utilization means for generating said pulsed signal in accordance with said pulse width.

10. The apparatus for claim 9 wherein said engine control device comprises one of an engine fuel injection means and an engine spark advance means.

11. An engine control apparatus adaptable to control an internal engine control device with a control signal having a pulse width determined by a first variable number of constant width increments each effecting a predetermined pulse width versues engine speed relationship which comprises said variable number of increments intermediate a predetermined highest engine speed value and an actual speed value and by a second increment selected to effect a second predetermined relationship with a second engine parameter, said engine control apparatus comprising:

a. means for generating a first engine speed dependent number of pulses and a second engine parameter dependent number of pulses varying respectively with the period in which the engine makes a revolution and said second engine parameter, b. means for commencing said predetermined relationship at said predetermined highest speed value and terminating at said actual value comprising means for generating said said number of said first increments from said engine speed dependent number of pulses and from a number of said second increments varying with said second engine parameter dependent number of pulses, said number of first increments effecting said predetermined engine speed relationship for said first engine speed dependent number of pulses and said number of second increment effects said second predetermined relationship for said second engine parameter dependent number of pulses; and c. utilization means for generating said pulsed signal in accordance with said pulse width.

12. The engine control apparatus of claim 11 wherein said second engine parameter comprises an engine load dependent parameter selected from the group comprising an engine manifold pressure dependent parameter, a throttle position dependent parameter, and an air flow dependent parameter.

13. In a fuel injection control system for controlling an internal combustione engine fuel injection device with a pulse signal the width of which is controllable in accordance with a predetermined engine speed relationship having a predetermined highest engine speed value and an actual engine speed value, pulse width control apparatus comprising:
  a. means for generating an engine speed dependent number of frequency pulses, varying in number with the time in which the engine makes a revolution; and
  b. interpolating means for interpolating from said highest speed pulse width value to said actual engine speed value in accordance with said predetermined engine speed relationship by incrementing said highest speed pulse width value with a variable number of increments generated from said engine speed dependent number of pulses each said increment effecting said predetermined engine speed relationship, whereby the incrementation of said highest speed pulse width value by said variable number of increments effects said actual pulse width value.

14. In an engine control system adapted to control an internal combustion engine control device comprising one of a fuel injector means and a spark advance means by a pulsed control signal having a pulse width determined from a first variable number of first increments effecting a first predetermined engine speed relationship comprising a first highest speed pulse width value and a second actual speed pulse width value and from a second variable number of second increments effecting a second predetermined engine dependent parameter relationship having a third pulse width value at an actual value of a second engine dependent parameter pulse width control apparatus for controlling said pulse width comprising:
  a. means responsive to the actual engine speed and said second engine parameter for generating a first engine speed dependent number of pulses and a second engine dependent parameter number of pulses, said first number of pulses varying in number with the difference between said highest and actual speed values and said second engine dependent parameter number of pulses varying with said second engine dependent parameter; and
  b. interpolating means for providing a third pulse width value adaptable to control said engine control device, said interpolating means comprising increment generating means and incrementing means, said increment generating means generating said first variable number of said first increments from said first engine speed dependent number of pulses and said second variable number of second increments from said second engine parameter dependent number of pulses and said incrementing means interpolating in accordance with said first predetermined engine speed relationship by incrementing said highest speed pulse width value with said variable number of said first increments to obtain said actual engine speed pulse width value and thereafter interpolating in accordance with said second predetermined scale relationship by incrementing said actual speed pulse width value for a number of said second increments varying with said second engine parameter dependent number of pulses to provide said third pulse width value.

15. In an engine control system for controlling an internal combustion engine combustion control device in accordance with a pulsed control signal having an incrementally variable pulse width determined in accordance with a predetermined engine speed characteristic comprising a variable number of increments intermediate a highest engine speed pulse width value and an actual engine speed pulse width value defined respectively above the highest attainable engine speed and at the actual engine speed, pulse width control apparatus for controlling said pulse width comprising:
  a. first pulse generating means for generating a pulse train of clock pulses;
  b. second pulse generating means for generating a second pulse train of sequential second pulses separated by a second pulse train interval defining a duration varying with engine speed;
  c. control means for generating a control signal comprising an engine speed dependent number of clock pulses varying with said duration of said second pulse train interval; and
  d. DDA interpolating means responsive to said control signal for generating said actual speed pulse width value from said highest speed pulse width value by incrementing said highest speed pulse width value with said variable number of increments said variable number of which is determined by said engine speed dependent number of clock pulses and said predetermined engine speed characteristic, said predetermined engine speed characteristic comprising a first segment and a second segment,
  1. said first segment comprising said highest engine speed pulse width value and a first slope portion bounded at one end by said highest speed pulse width value and the other end by an intermediate pulse width value defined at an engine speed intermediate said highest and actual engine speeds, said first slope portion providing a first predetermined rate of change of said pulse width values with engine speeds intermediate said highest and said intermediate engine speeds; and
  2. said second segment comprising said intermediate pulse width value and said actual engine speed value and a second slope portion bounded at a first end by said intermediate speed pulse width value and at a second end by said actual speed pulse width value, said second slope portion providing a second predetermined rate of change of said pulse width values with engine speeds intermediate said intermediate and actual engine speeds.

16. An engine fuel control system for controlling the fuel pulse width of fuel injected into an intermittently firing internal combustion engine in accordance with engine speed and an engine load dependent parameter comprising:
  a. first pulse generating means for generating a clock pulse train of fixed frequency clock pulses;
  b. second pulse generating means for generating a second pulse train of sequential second pulses separated by a second pulse train interval the duration of which varies with engine speed;

c. third pulse generating means for generating a third pulse train of sequential third pulses separated by a third pulse train interval the duration of which varies with said engine load dependent parameter;

d. control means connected to communicate with said first, second, and third pulse generating means for providing an engine speed dependent number of clock pulses and an engine load dependent parameter dependent number of clock pulses, said engine speed dependent number of clock pulses varying with said duration of said second pulse train interval and said engine load dependent parameter dependent number of clock pulses varying with said duration of said third pulse train interval, e. means for interpolating along a first preselected value of rate of change of fuel pulse width with engine speed by incrementing one fuel pulse width value repetitively with said first rate of change value for a number of first incrementations varying with said engine speed dependent number of clock pulses to provide a second fuel pulse width value and for interpolating along a second value of rate of change of fuel pulse width with said engine load dependent parameter by incrementing said second fuel pulse width value repetitively with said second rate of change value for a number of second incrementations varying with said engine load dependent parameter dependent number of clock pulses to provide a third fuel pulse width value, said one fuel pulse width value defined at an engine speed above the highest engine speed attainable; and f. utilization means for using said third fuel pulse width value for controlling fuel injection to said engine.

17. In the fuel control system of claim 16, said engine load dependent parameter selected from the group of engine load dependent parameters comprising an engine manifold pressure dependent parameter, an engine throttle position dependent parameter, and an engine air flow dependent parameter.

18. An engine fuel control system for controlling the fuel pulse width of fuel injected into an intermittently firing internal combustion engine in accordance with the engine speed thereof comprising:

a. means for generating an engine speed dependent number of constant frequency pulses; and b. interpolating means for interpolating along a preselected characteristic of fuel pulse width change with engine speed, said characteristic comprising at least first and second segments each comprising a rate of change slope intermediate a start point and an end point, said interpolating means comprising 1. memory means including slope, start point, and end point locations each respectively filled with contents defining a different said slope, start point, and end point, 2. first, second, and third register means, 3. memory accessing means for establishing said first register means in a first segment condition permitting interpolation along said first segment and in a second segment condition permitting interpolation along said second segment and for initially establishing said first segment condition by filling said first register means with said slope location contents defining said first segment slope and filling said third register means with said start point location contents defining said first segment start point, 4. first adder means operative on the occurrence of each separate pulse of said engine speed dependent number of pulses to combine said slope location contents of said first register means with contents of said second register means, to recirculate said combined contents to said second register means, and to combine an output pulse with said point location contents of said third register means when the magnitude of said combined contents recirculated to said second register means is not within a predetermined range of magnitudes, and 5. means for causing said memory accessing means to establish said second segment condition by filling said first register means with said slope location contents defining said second segment slope when the end point location contents defining said first end point equals the contents of said third register means; and c. utilization for controlling the injection of fuel to said engine in accordance with said contents of said third register means.

19. An engine control apparatus adaptable to control an internal combustion engine control device with a pulsed control signal the pulse width of which is determined in accordance with a predetermined characteristic defining the change of pulse width with an engine parameter, said characteristic comprising at least a first segment and a second segment, said first segment defined by a start point, an end point, and a first slope portion effecting a first preselected rate of change of said engine parameter between said points and said engine parameter and said second segment defined by said end point of said first segment, a second end point, and a second slope portion effecting a second preselected scale rate of change scale between said points and said engine parameter, said engine control apparatus comprising:

a. means for generating an engine parameter dependent number of pulses; and b. means for generating said pulse width comprising 1. memory means comprising a start point location, a first scale location, a first end point location, and a second scale location, said memory locations respectively filled with contents defining said start point, said first scale, said end point, and said second scale, 2. scale register means, R register means, and pulse width register means, 3. memory accessing means for establishing said scale register means in a first segment condition for effecting incrementation along said first segment and in a second segment condition for effecting incrementation along said second segment and for initially establishing said first segment condition by filling said scale register means with said contents of said first scale location and filling said pulse width register means with said contents of said first start point location, 4. adder means enabled by each pulse of said engine parameter dependent number of pulses to combine said contents of said scale register means with contents of said R register means, to fill said R register means with said combined contents of said scale register means and said R register means, to generate an output pulse when said combined contents is not within a predetermined range of magnitude, and to combine said output pulse with said contents of said pulse width register means, and 5. means for causing said memory accessing means to establish said second segment condition by filling said scale register means with said contents of said second scale location when said contents of said first end point location exceeds said contents of said pulse width register means.

20. An engine control apparatus adaptable to control an internal combustion engine combustion control device with a pulsed control signal having a pulse width value effecting a predetermined engine parameter dependent relationship determined by a product of said pulse width value and a predetermined component thereof comprising a radix raised to a power, said control apparatus comprising:
    a. means for generating said product from a first said pulse width value and said predetermined component thereof;
    b. means for incrementing said first pulse width value with said product to generate a second pulse width value; and
    c. utilization means for controlling said control device in accordance with said second pulse width value.

21. An engine control apparatus adaptable to control an internal combustion engine control device with a pulsed control signal a pulse width of which is selected to effect a predetermined relationship between a value of said pulsed width and an engine parameter, said predetermined relationship varying with a product of said pulse width value and constnat component thereof comprising a predetermined power of a predetermined radix, said engine control apparatus comprising:
    a. means for generating an engine parameter dependent number of pulses varying with said engine parameter;
    b. first means for generating a said predetermined component and a said product from a first said pulse width value;
    c. second means for incrementing said first pulse width value with said product to generate a second pulse width value; and
    d. utilization means for controlling said control device in accordance with said second pulse width value.

22. An engine control apparatus adaptable to control an internal combustion engine control device with a pulse control signal having a pulse width determined in accordance with an increment selected to effect a predetermined relationship between a value of said pulse width and an engine parameter, said predetermined relationship comprising an exponential power of a predetermined constant, said power varying with said engine parameter, and said predetermined relationship varying with a product of a said pulse width value and a constant component of a logarithm of said predetermined constant, said control apparatus comprising:
    a. means for generating an engine parameter dependent number of pulses varying with said engine parameter;
    b. interpolating means for generating an i + lth said pulse width value from an ith pulse width value for each of said engine dependent number of pulses, said interpolating means comprising:
        1. M-stage register means containing contents determining an ith pulse width value and comprising an mth stage and an m-jth stage operatively connected to provide contents related by said constant component, and
        2. iteration means for incrementing said contents of said mth stage with said related contents of said m-jth stage generating an i + lth pulse width value, and filling said m-stage register means with said i + lth pulse width value for each of a number of such iterations varying with said engine dependent number of pulses, whereby said interpolating effect said predetermined relationship in accordance with said engine dependent number of pulses; and
    c. utilization means for controlling said engine control device in accordance with said pulse width values.

23. In an engine control system for controlling an internal combustion engine control device in accordance with a pulsed control signal having a $T_{i+l}$ pulse width value determined from an engine pressure P in accordance with the relationship $$T_{i+l} = T_i + (\ln B) T_i \Delta P,$$

the value of lnB comprising a predetermined component including a $2^{-(n)}$ factor, pulse width control apparatus comprising:
    a. means for generating an engine pressure dependent number of pulses varying with said engine pressure; and
    b. interpolating means for generating a final pulse width value comprising:
        1. m-stage register means containing contents defining said $T_i$ pulse width value and comprising an mth stage for issuing said $T_i$th value and a jth stage for issuing a factor value varying with the product of said $T_i$th value and said $2^{-(n)}$ factor, the number n being an integer determined by the position of the jth stage relative to the mth stage; and
        2. incrementing means for effecting a number of iterations varying with said engine pressure dependent number of pulses and for in each said iteration incrementing said $T_i$th value issued by said mth stage with said factor value issued by by said jth stage, generating a $T_{i+lth}$ value, and recirculating said $T_{i+lth}$ value to said m-stage register means.

24. In an engine control system for controlling an internal combustion engine control device in accordance with a pulsed control signal having a $T_{i+l}$ pulse width value determined from an engine load dependent parameter P in accordance with the relationship $$T_{i+l} = T_i + (\ln B) T_i \Delta P,$$

the value of lnB comprising a predetermined component including a $2^{-(n)}$ factor, pulse width control apparatus comprising:
    a. means for generating a number of pulses varying with said engine load dependent parameter; and
    b. interpolating means for generating a pulse width value comprising:
        1. m-stage register means containing contents defining said $T_i$ pulse width value and comprising an mth stage for issuing said $T_i$th value and a jth stage for issuing a factor value varying with the product of said $T_i$th value and said $2^{-(n)}$ factor, the number n being an integer determined by the position of the jth stage relative to the mth stage; and 2. iteration means for incrementing said $T_i$th value issued by said mth stage with said factor value issued by said jth stage, generating a $T_{i+1th}$ value, and recirculating said $T_{i+1th}$ value to said m-stage register means for each of a number of iterations varying with said engine load dependent parameter number of pulses, whereby said interpolating means effects said relationship in accordance with said engine load parameter dependent number of pulses.

25. In the engine control system of claim 24, said engine load dependent parameter comprising an engine manifold pressure dependent parameter.

26. In the engine control system of claim 24, said engine load dependent parameter comprising an engine air flow rate dependent parameter.

27. In the engine control system of claim 24, said engine load dependent parameter comprising an engine temperature dependent parameter.

28. In an engine control system for controlling an internal combustion engine combustion control device in accordance with a pulsed control signal having an incrementally variable pulsed width determined in accordance with a predetermined engine load characteristic, pulse width control apparatus for controlling said pulse width comprising:
   a. first pulse generating means for generating a pulse train of clock pulses;
   b. second pulse generating means for generating a second pulse train of sequential second pulses separated by a second pulse train interval defined by a duration varying with engine speed;
   c. control means for generating a control signal comprising an engine load parameter dependent number of clock pulses varying with an engine load dependent parameter; and
   d. DDA interpolating means responsive to said control signal for generating an incrementing number of successive pulse width values varying with said engine load parameter dependent number of clock pulses and with said predetermined engine load parameter characteristic, said predetermined engine load parameter characteristic comprising the formula $$T_{i+1} = T_i + (\ln B)T_i \Delta P,$$

wherein
   1. $T_i$ and $T_{i+1}$ are successive pulse width values,
   2. $\Delta P$ is a change in values of said engine load dependent parameter between said successive pulse width values, and
   3. lnB comprises a factor having a value of $2^{-n}$.

29. An electronic fuel injection system for controlling fuel injection to an internal combustion engine having engine speed transducer means and engine air intake manifold pressure transducer means for respectively generating an engine speed signal and a manifold pressure signal varying with the engine speed and engine air intake manifold pressure, comprising:
   a. Digital schedule generating means for effecting a predetermined engine fuel versus engine speed versus engine manifold pressure schedule comprising a first engine fuel versus engine speed schedule portion and a second engine fuel versus engine manifold pressure schedule portion, said engine fuel versus speed schedule comprising a highest engine speed pulse width value defined at an engine speed above the highest engine speed attainable and an actual engine speed value defined at the actual engine speed and said fuel versus schedule comprising said actual speed pulse width value and an actual engine pressure pulse width value, said digital engine schedule generating means responsive first to said engine speed signal to generate a first fuel output in accordance with said first schedule portion, and said digital schedule generating means then responsive to said first fuel output and to said pressure signal to generate a second fuel output in accordance with said second schedule portion; said digital engine schedule generating means comprising first and second interpolating means, said first interpolating means effecting said engine fuel versus engine speed schedule portion by interpolating therealong from said highest engine speed pulse width value for a first variable number of iterations determined directly from the magnitude of said engine speed signal, and said second interpolating means effecting said fuel versus pressure portion by interpolating therealong from said actual speed pulse width value for a number of iterations determined directly from the magnitude of said pressure signal; and
   b. utilization means responsive to said second fuel output to selectively actuate at least one fuel injector in a group of fuel injectors.

30. The electronic fuel injection system of claim 29 wherein said engine fuel versus engine speed portion comprises two contiguous segments joined at an intersection defining a predetermined engine speed, and said digital schedule generating means generates one of said first and second fuel outputs in accordance with said first segment when the magnitude of said engine speed signal is in excess of said predetermined engine speed and in accordance with said second segment when the magnitude of said engine speed signal is less than said predetermined engine speed.

31. The electronic fuel injection system of claim 29 wherein said engine fuel versus manifold pressure portion comprises a predetermined logarithmic relationship between engine fuel and engine pressure, said predetermined logarithmic relationship including a factor having a value of $2^{-n}$, where n comprises the difference between two different bit positions of a shift register, said factor being generator by adding bit for bit one of said two different bit positions to the other.

* * * * *